United States Patent
Bhogal et al.

(10) Patent No.: US 11,788,732 B2
(45) Date of Patent: Oct. 17, 2023

(54) CONNECTED FOOD PREPARATION SYSTEM AND METHOD OF USE

(71) Applicant: June Life, Inc., San Francisco, CA (US)

(72) Inventors: Nikhil Bhogal, San Francisco, CA (US); Matthew Van Horn, San Francisco, CA (US); Seunghoon Park, San Francisco, CA (US); Ravishankar Sivalingam, San Francisco, CA (US); Christopher Russell Clark, San Francisco, CA (US)

(73) Assignee: June Life, Inc., San Francisco, CA (US)

( * ) Notice: Subject to any disclaimer, the term of this patent is extended or adjusted under 35 U.S.C. 154(b) by 230 days.

(21) Appl. No.: 16/890,594

(22) Filed: Jun. 2, 2020

(65) Prior Publication Data

US 2020/0292177 A1 Sep. 17, 2020

Related U.S. Application Data

(63) Continuation of application No. 16/008,478, filed on Jun. 14, 2018, now Pat. No. 10,801,734, which is a (Continued)

(51) Int. Cl.
*A23L 5/10* (2016.01)
*F24C 7/08* (2006.01)
(Continued)

(52) U.S. Cl.
CPC .............. *F24C 7/086* (2013.01); *A23L 5/15* (2016.08); *A23L 5/17* (2016.08); *A47J 36/321* (2018.08);
(Continued)

(58) Field of Classification Search
CPC .......... F24C 7/086; F24C 7/085; F24C 7/087; F24C 7/062; F24C 3/124; F24C 15/008;
(Continued)

(56) References Cited

U.S. PATENT DOCUMENTS 3,453,997 A 7/1969 Klepzig
3,911,893 A 10/1975 Baker et al.
(Continued)

FOREIGN PATENT DOCUMENTS

CN 1900858 A 1/2007
CN 101044362 A 9/2007
(Continued)

OTHER PUBLICATIONS

"Cooking with Brava", https://www.brava.com/welcome/CookingWithBrava.
(Continued)

*Primary Examiner* — Avinash A Savani
(74) *Attorney, Agent, or Firm* — Jeffrey Schox; Diana Lin

(57) ABSTRACT

A connected oven, including a set of in-cavity sensors and a processor configured to automatically identify foodstuff within the cooking cavity, based on the sensor measurements; and automatically operate the heating element based on the foodstuff identity.

11 Claims, 17 Drawing Sheets

Related U.S. Application Data continuation of application No. 15/450,546, filed on Mar. 6, 2017, now Pat. No. 10,082,648, which is a continuation of application No. 15/147,597, filed on May 5, 2016, now Pat. No. 9,644,847.

(60) Provisional application No. 62/157,325, filed on May 5, 2015.

(51) Int. Cl.
  *H04W 4/80* (2018.01)
  *H05B 1/02* (2006.01)
  *A47J 36/32* (2006.01)
  *A47J 37/06* (2006.01)
  *F24C 3/12* (2006.01)
  *F24C 15/00* (2006.01)
  *F24C 7/06* (2006.01)

(52) U.S. Cl.
  CPC ....... *A47J 37/0623* (2013.01); *A47J 37/0664* (2013.01); *F24C 3/124* (2013.01); *F24C 7/085* (2013.01); *F24C 7/087* (2013.01); *F24C 15/008* (2013.01); *H04W 4/80* (2018.02); *H05B 1/0263* (2013.01); *A23V 2002/00* (2013.01); *F24C 7/062* (2013.01)

(58) Field of Classification Search
  CPC ..... A23L 5/17; A23L 5/15; H04W 4/80; A47J 36/321; A47J 37/0664; H05B 1/0263; A23V 2002/00
  USPC ...................................................... 126/19 R
  See application file for complete search history.

(56) References Cited

U.S. PATENT DOCUMENTS

| | | | |
|---|---|---|---|
| 4,415,790 A | 11/1983 | Diesch et al. | |
| 4,591,684 A | 5/1986 | Tanabe et al. | |
| 5,154,940 A | 10/1992 | Budzyna et al. | |
| 5,170,024 A | 12/1992 | Hanatani et al. | |
| 5,360,965 A | 11/1994 | Ishii et al. | |
| 5,361,681 A | 11/1994 | Hedstroem et al. | |
| 5,412,448 A | 5/1995 | Kunishige | |
| 5,520,095 A | 5/1996 | Huber et al. | |
| 5,546,475 A | 8/1996 | Bolle et al. | |
| 5,981,916 A | 11/1999 | Griffiths et al. | |
| 6,011,242 A * | 1/2000 | Westerberg | G01L 1/144 |
| | | | 219/486 |
| 6,060,701 A | 5/2000 | McKee et al. | |
| 6,299,921 B1 | 10/2001 | Loeffler et al. | |
| 6,310,964 B1 | 10/2001 | Mohan et al. | |
| 6,359,270 B1 | 3/2002 | Bridson | |
| 6,384,384 B1 | 5/2002 | Connolly et al. | |
| 6,486,453 B1 | 11/2002 | Bales et al. | |
| 6,759,635 B2 | 7/2004 | Lile | |
| 6,789,067 B1 | 9/2004 | Liebenow | |
| 6,821,016 B2 | 11/2004 | Sato et al. | |
| 6,856,247 B1 | 2/2005 | Wallace | |
| 6,862,494 B2 | 3/2005 | Hu et al. | |
| 7,013,661 B2 | 3/2006 | Gatling et al. | |
| 7,102,107 B1 | 9/2006 | Chapman | |
| 7,150,891 B2 | 12/2006 | Greiner et al. | |
| 7,445,381 B2 | 11/2008 | Rund et al. | |
| 7,516,692 B2 | 4/2009 | Pirkle et al. | |
| 7,566,168 B2 | 7/2009 | Rund et al. | |
| 7,663,502 B2 | 2/2010 | Breed | |
| 7,845,823 B2 | 12/2010 | Mueller et al. | |
| 7,973,642 B2 | 7/2011 | Schackmuth et al. | |
| 8,091,543 B2 | 1/2012 | Baumann et al. | |
| 8,193,474 B2 | 6/2012 | Harris | |
| 8,426,777 B2 | 4/2013 | Elston et al. | |
| 8,555,776 B2 | 10/2013 | Debord et al. | |
| 8,766,144 B2 | 7/2014 | Mcloughlin et al. | |
| 8,931,400 B1 | 1/2015 | Allen | |
| 9,017,751 B2 | 4/2015 | Rauh | |
| 9,041,799 B2 | 5/2015 | Bielstein | |
| 9,069,340 B2 | 6/2015 | Minvielle | |
| 9,149,058 B2 | 10/2015 | Bilet et al. | |
| 9,414,444 B2 | 8/2016 | Libman et al. | |
| 9,460,633 B2 | 10/2016 | Minvielle | |
| 9,494,322 B2 | 11/2016 | Luckhardt et al. | |
| 9,528,972 B2 | 12/2016 | Minvielle | |
| 9,564,064 B2 | 2/2017 | Minvielle | |
| 9,644,847 B2 | 5/2017 | Bhogal et al. | |
| 9,933,166 B2 | 4/2018 | Matarazzi et al. | |
| 10,024,736 B2 | 7/2018 | Nivala et al. | |
| 10,057,946 B2 | 8/2018 | Mills et al. | |
| 10,092,129 B2 | 10/2018 | Jenkins et al. | |
| 10,559,186 B2 | 2/2020 | Allen | |
| 2002/0005406 A1 | 1/2002 | Fukunaga et al. | |
| 2003/0047553 A1 | 3/2003 | Patti et al. | |
| 2003/0139843 A1 | 7/2003 | Hu et al. | |
| 2004/0104222 A1 | 6/2004 | Lee | |
| 2005/0046584 A1 | 3/2005 | Breed | |
| 2005/0193901 A1 | 9/2005 | Buehler | |
| 2005/0211104 A1 | 9/2005 | Harris et al. | |
| 2006/0185523 A1 | 8/2006 | Wiedemann et al. | |
| 2006/0218057 A1 | 9/2006 | Fitzpatrick et al. | |
| 2007/0001012 A1 | 1/2007 | Kim et al. | |
| 2007/0007279 A1 | 1/2007 | Chun et al. | |
| 2007/0029306 A1 | 2/2007 | Chun et al. | |
| 2007/0042091 A1 | 2/2007 | Rund et al. | |
| 2007/0215599 A1 | 9/2007 | Kahler | |
| 2008/0029078 A1 | 2/2008 | Baumann et al. | |
| 2008/0032018 A1 | 2/2008 | Garniss et al. | |
| 2008/0043809 A1 | 2/2008 | Herbert | |
| 2008/0110999 A1 | 5/2008 | Jerovsek | |
| 2008/0120188 A1 | 5/2008 | Mobley et al. | |
| 2008/0193614 A1 | 8/2008 | Greiner et al. | |
| 2008/0274240 A1 | 11/2008 | Germouni et al. | |
| 2009/0134151 A1 | 5/2009 | Bogatin et al. | |
| 2009/0255920 A1 | 10/2009 | Bonassi et al. | |
| 2009/0274805 A1 | 11/2009 | Schonemann | |
| 2010/0006558 A1 | 1/2010 | Mcloughlin et al. | |
| 2010/0021606 A1 | 1/2010 | Rauh | |
| 2010/0124378 A1 | 5/2010 | Das et al. | |
| 2010/0134620 A1 | 6/2010 | Bielstein | |
| 2010/0138075 A1 | 6/2010 | Boer et al. | |
| 2010/0140248 A1 * | 6/2010 | Yi | F24C 7/087 |
| | | | 219/490 |
| 2010/0145483 A1 | 6/2010 | Mcgonagle et al. | |
| 2010/0147823 A1 | 6/2010 | Anderson et al. | |
| 2010/0320189 A1 | 12/2010 | Buchheit | |
| 2011/0002677 A1 | 1/2011 | Cochran et al. | |
| 2011/0022211 A1 | 1/2011 | Mcintyre et al. | |
| 2011/0123689 A1 | 5/2011 | Luckhardt et al. | |
| 2011/0127252 A1 | 6/2011 | Yu et al. | |
| 2011/0284518 A1 | 11/2011 | Elston et al. | |
| 2012/0017882 A1 | 1/2012 | Kitaguchi et al. | |
| 2012/0038549 A1 | 2/2012 | Mandella et al. | |
| 2012/0076351 A1 | 3/2012 | Yoon et al. | |
| 2012/0099761 A1 | 4/2012 | Yoon et al. | |
| 2012/0100269 A1 | 4/2012 | Polt | |
| 2012/0125921 A1 | 5/2012 | Shim et al. | |
| 2012/0170247 A1 | 7/2012 | Do | |
| 2012/0288595 A1 | 11/2012 | Randall et al. | |
| 2013/0052310 A1 | 2/2013 | Stanford | |
| 2013/0084369 A1 | 4/2013 | Smrke | |
| 2013/0092680 A1 | 4/2013 | Cartwright et al. | |
| 2013/0092682 A1 | 4/2013 | Mills et al. | |
| 2013/0171304 A1 | 7/2013 | Huntley | |
| 2013/0176116 A1 | 7/2013 | Jung et al. | |
| 2013/0186887 A1 | 7/2013 | Hallgren et al. | |
| 2013/0269539 A1 | 10/2013 | Polt | |
| 2013/0277353 A1 | 10/2013 | Joseph et al. | |
| 2013/0302483 A1 | 11/2013 | Riefenstein | |
| 2013/0306052 A1 | 11/2013 | Price et al. | |
| 2013/0306627 A1 | 11/2013 | Libman et al. | |
| 2014/0026762 A1 | 1/2014 | Riefenstein | |
| 2014/0086274 A1 | 3/2014 | Henke | |
| 2014/0199455 A1 | 7/2014 | Bilet et al. | |
| 2014/0203012 A1 | 7/2014 | Corona et al. | |

(56) References Cited

U.S. PATENT DOCUMENTS

| | | |
|---|---|---|
| 2014/0242227 A1 | 8/2014 | Yang et al. |
| 2014/0297467 A1 | 10/2014 | Soller et al. |
| 2014/0334691 A1 | 11/2014 | Cho et al. |
| 2015/0037472 A1 | 2/2015 | Fung et al. |
| 2015/0056344 A1 | 2/2015 | Luckhardt |
| 2015/0136760 A1 | 5/2015 | Lima et al. |
| 2015/0170000 A1 | 6/2015 | Yang et al. |
| 2015/0285513 A1 | 10/2015 | Matarazzi et al. |
| 2015/0289324 A1 | 10/2015 | Rober et al. |
| 2016/0063734 A1 | 3/2016 | Divakaran et al. |
| 2016/0098465 A1 | 4/2016 | Wu et al. |
| 2016/0242240 A1 | 8/2016 | Lee et al. |
| 2016/0278563 A1 | 9/2016 | Choudhary |
| 2016/0283822 A1 | 9/2016 | Imai et al. |
| 2016/0296055 A1 | 10/2016 | Schilling |
| 2016/0302265 A1* | 10/2016 | Kreiner ............... H05B 6/6455 |
| 2017/0011649 A1 | 1/2017 | Lee et al. |
| 2017/0074522 A1 | 3/2017 | Cheng |
| 2017/0116661 A1 | 4/2017 | Sundaram |
| 2017/0132950 A1 | 5/2017 | Harrison |
| 2017/0150842 A1 | 6/2017 | Young et al. |
| 2017/0208652 A1 | 7/2017 | Luckhardt et al. |
| 2017/0224161 A1 | 8/2017 | Li et al. |
| 2017/0332841 A1 | 11/2017 | Reischmann |
| 2018/0101608 A1 | 4/2018 | Thysell |
| 2018/0184668 A1 | 7/2018 | Stork Genannt Wersborg |
| 2018/0324908 A1 | 11/2018 | Denker et al. |
| 2019/0110638 A1 | 4/2019 | Li et al. |
| 2019/0234617 A1 | 8/2019 | Bhogal et al. |
| 2019/0250043 A1 | 8/2019 | Wu et al. |
| 2019/0354810 A1 | 11/2019 | Samel et al. |
| 2020/0069103 A1 | 3/2020 | Baldwin et al. |

FOREIGN PATENT DOCUMENTS

| | | |
|---|---|---|
| CN | 101504158 A | 8/2009 |
| CN | 201353794 Y | 12/2009 |
| CN | 202392848 U | 8/2012 |
| CN | 103234228 A | 8/2013 |
| CN | 103592227 A | 2/2014 |
| CN | 104042124 A | 9/2014 |
| CN | 203914599 U | 11/2014 |
| CN | 104246375 A | 12/2014 |
| DE | 19828333 A1 | 12/1999 |
| DE | 202008000135 | 3/2008 |
| DE | 102008043722 A1 | 5/2010 |
| DE | 102012204229 A1 | 9/2013 |
| EP | 0298858 A1 | 1/1989 |
| EP | 0899512 A1 | 3/1999 |
| EP | 1179711 A1 | 2/2002 |
| EP | 1746350 A2 | 1/2007 |
| EP | 2149755 A1 | 2/2010 |
| EP | 2618634 A1 | 7/2013 |
| GB | 1163509 A | 9/1969 |
| GB | 1195750 A | 6/1970 |
| JP | 11-63509 | 3/1999 |
| JP | 2004187778 A | 7/2004 |
| JP | 2005276171 A | 10/2005 |
| JP | 201353794 | 3/2013 |
| WO | 2006128696 A1 | 12/2006 |
| WO | 2007022507 A2 | 2/2007 |
| WO | 2009012874 A2 | 1/2009 |
| WO | 2013167333 A1 | 11/2013 |
| WO | 2014086486 A2 | 6/2014 |
| WO | 2014086487 A1 | 6/2014 |
| WO | 2015059931 A1 | 4/2015 |
| WO | 2019232113 A1 | 12/2019 |

OTHER PUBLICATIONS

"Cooking with Light", https://blog.brava.com/2020/02/27/cooking-with-light/.

"The Brava Tutorial—Youtube", https://www.youtube.com/watch?v=ZoW4iSb5U5k&t=1992s, Oct. 1, 2020.

"The Level Oven", https://level.ai.

International Search Report and Written Opinion for Application No. PCT/2021/024648 dated Jun. 23, 2021.

Chen, Pengfei, et al., "Understanding and Utilizing Deep Neural Networks Trained with Noisy Labels", Proceeding of the 36th International Conference on Machine Learning, Long Beach, California, PMLR 97, 2019.

Li, Xin, et al., "On-Line Temperature Estimation for Noisy Thermal Sensors Using a Smoothing Filter-Based Kalman Predictor", Sensors, 2018, 18, 433, www.mdpi.com/journal/sensors.

Reitermanova, Z., et al., "Data Splitting", WDS '10 Proceedings of Contributed Papers, Part I, 31-36, 2010.

https://www.greatgrubdelicioustreats.com/fried-egg-grilled-cheese-sandwich/, "Great Grub, Delicious Treats"; Nov. 29, 2015; u download date Apr. 13, 2021; pp. 1-24.

U.S. Appl. No. 12/216,999, filed Jul. 14, 2008, Kim, et al.
U.S. Appl. No. 13/059,486, filed Aug. 26, 2009, Sakane, et al.
U.S. Appl. No. 13/978,413, filed Apr. 19, 2012, Ruther.
U.S. Appl. No. 14/205,587, filed Mar. 12, 2014, Chadwick, et al.
U.S. Appl. No. 14/205,593, filed Mar. 12, 2014, Chadwick, et al.
U.S. Appl. No. 15/510,544, filed Oct. 9, 2015, Kondo, et al.

"Electrolux launches CombiSteam Pro Smart", http://www.homeappliancesworld.com/2018/03/08/electrolux-launches-combisteam-pro-smart/, downloaded from internet on Jan. 18, 2019, 2 pages.

Automated Fruit Recognition for Super Markets and Food Stores, Fraunhofer, http://www.iosb.fraunhofer.de/servlet/is/33328/, accessed online Nov. 13, 2014.

Sun, Da-Wen; "Computer Vision Technology For Food Quality Evaluation", Second Edition, Academic Press, 2016.

Fang, Chi et al. "Cooking Time Optimization on Given Machine Constraints and Order Constraints" Integer Programming Approach, Dec. 17, 2016.

Karimi, Davood "Deep learning with noisy labels: exploring techniques and remedies in medical image analysis" arXiv:1912.02911v4 [cs.CV] Mar. 20, 2020.

Xu, Yan, et al., "Multiple Clustered Instance Learning for Histopathology Cancer Image Classification, Segmentation and Clustering", 2012, IEEE (Year: 2012).

* cited by examiner

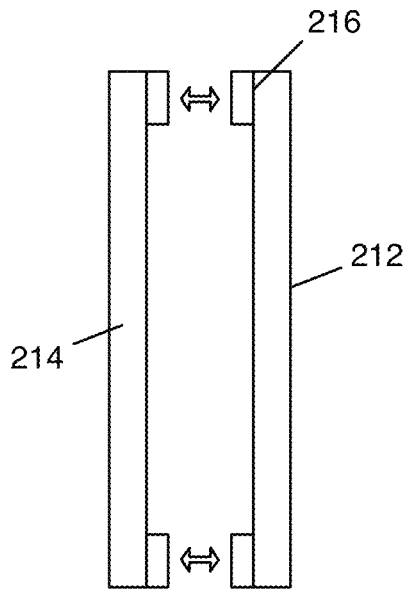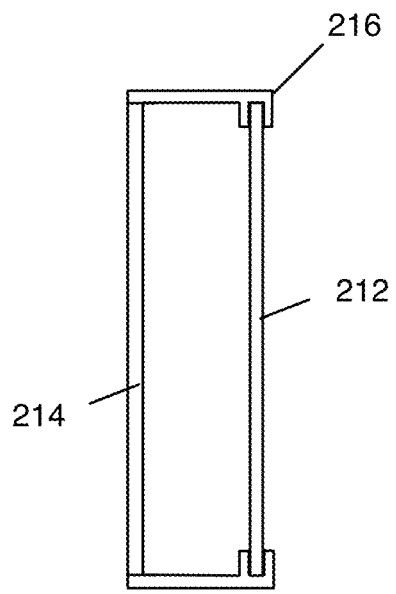
FIGURE 7                    FIGURE 8
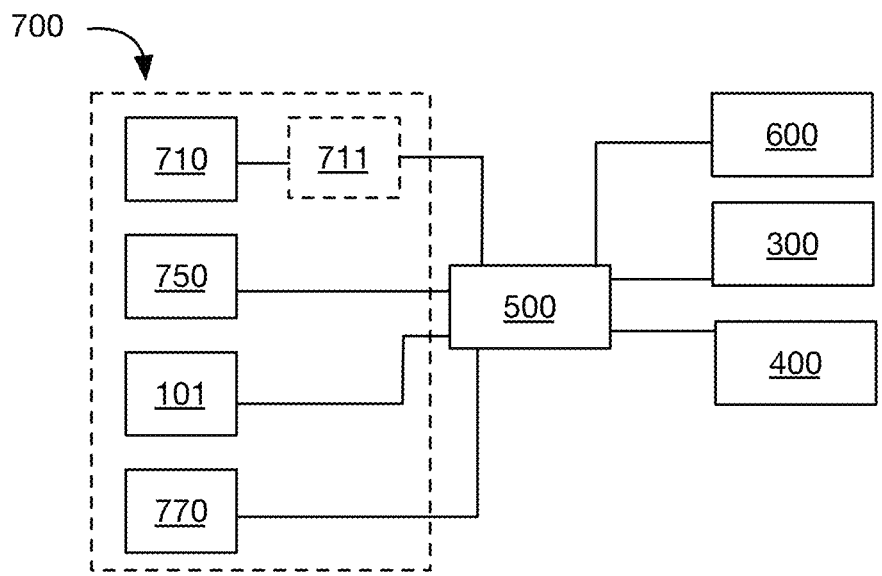
FIGURE 9

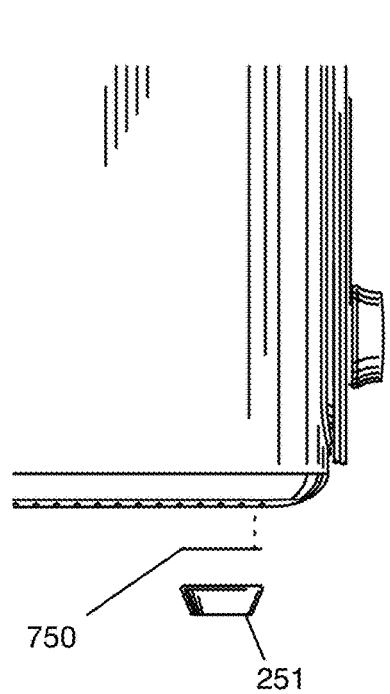
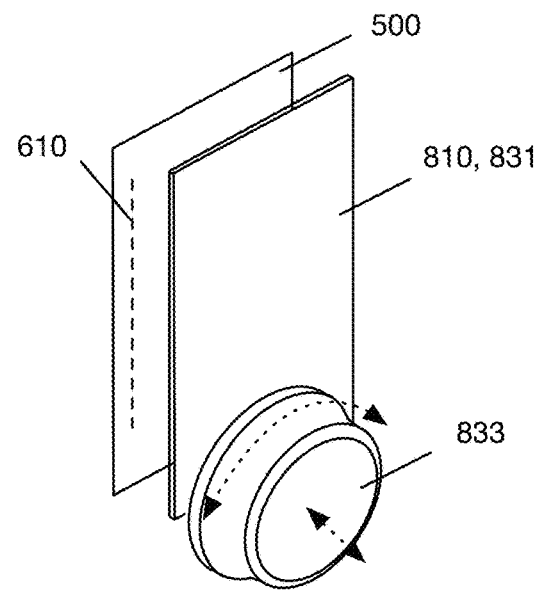
FIGURE 14
FIGURE 15
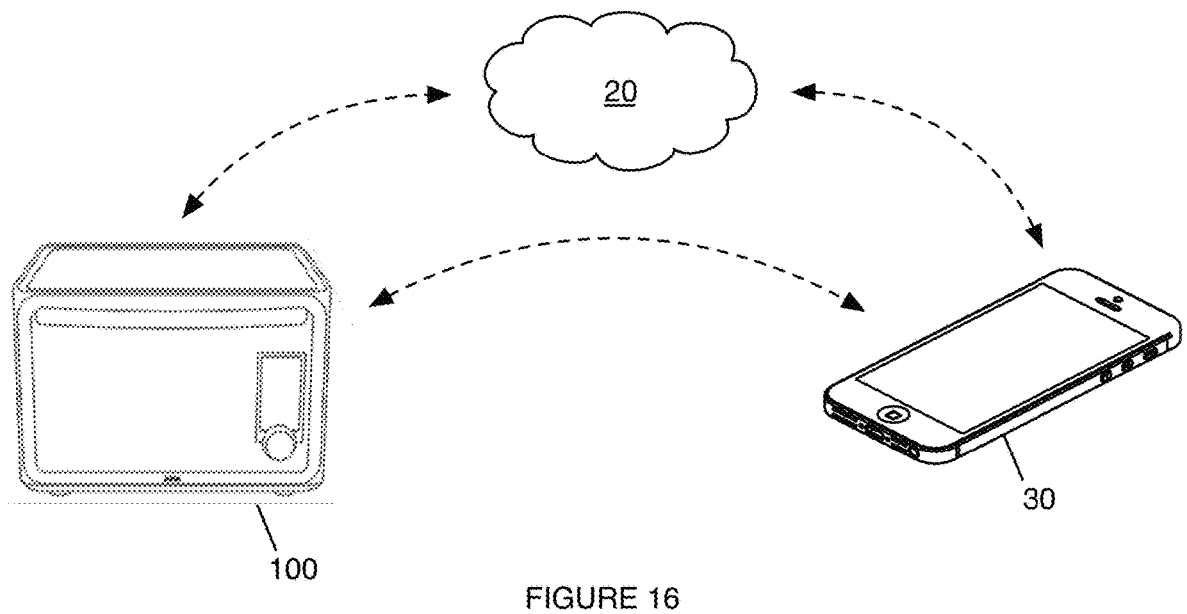
FIGURE 16

US 11,788,732 B2

CONNECTED FOOD PREPARATION SYSTEM AND METHOD OF USE

CROSS-REFERENCE TO RELATED APPLICATIONS

This application is a continuation of U.S. application Ser. No. 16/008,478 filed 14 Jun. 2018, which is a continuation of U.S. application Ser. No. 15/450,546, filed 6 Mar. 2017, now issued as U.S. Pat. No. 10,024,544, which is a continuation of U.S. application Ser. No. 15/147,597, filed 5 May 2016, now issued as U.S. Pat. No. 9,644,847, which claims the benefit of U.S. Provisional Application No. 62/157,325 filed 5 May 2015, each of which are incorporated in their entirety by this reference.

TECHNICAL FIELD

This invention relates generally to the food preparation field, and more specifically to a new and useful oven in the food preparation field.

BRIEF DESCRIPTION OF THE FIGURES

FIGS. 7 and 8 are schematic representations of a first and second variation of the door with a first and second coupling mechanism, respectively.

FIG. 9 is a schematic representation of a variation of the connections between oven components.

FIG. 14 is an exploded view of a variation of force sensor arrangement within the oven.

FIG. 15 is an exploded view of a variation of the user interface unit.

FIG. 16 is a schematic representation of a variation of the system.

DESCRIPTION OF THE PREFERRED EMBODIMENTS

Figure 1:
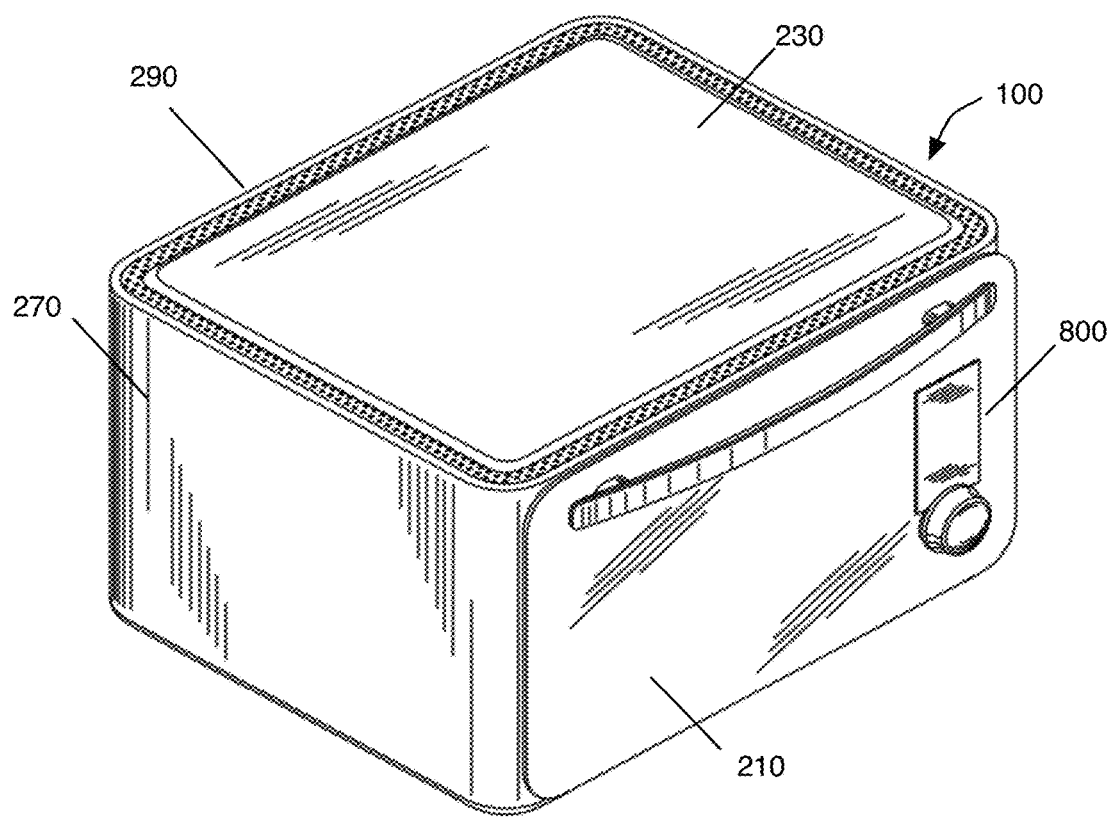
FIG. 1 is an isometric view from the top right of a variation of the oven.

The following description of the preferred embodiments of the invention is not intended to limit the invention to these preferred embodiments, but rather to enable any person skilled in the art to make and use this invention.

1. Connected Oven 100.

The connected oven 100 can include a cooking lumen defining a cavity (cooking chamber, cooking volume), a set of heating elements 300, a set of convection elements 400, a processing system 500, a communication system 600, and a set of sensors 700. The oven 100 can additionally include a user interface unit configured to receive instructions from the user. The oven 100 functions to cook foodstuff 10 based on instructions received from a remote system 20. The oven 100 can additionally function to automatically adjust oven control parameters to achieve a target food parameter (e.g., in real- or near-real time).

1.1 Potential Benefits.

The connected oven 100 can confer several benefits over conventional ovens. First, the connected oven 100 can decrease the physical footprint occupied by the oven 100 and/or increase the oven's cavity volume (interior volume) to exterior volume ratio. In particular, the connected oven's interior to exterior volume ratio can be increased over conventional ovens by: eliminating control panel space and replacing the user interface with a touchscreen 831 and knob; using cone fans, which can reduce the required back depth; connecting the power cable to the oven 100 bottom, which can decrease the separation distance between the oven 100 and the wall; and/or including a cool-touch exterior using thermal insulation mechanisms, which can also decrease wall separation distance. In a specific example, the oven 100 can have an external volume of 13 in by 22 in by 18 in, while having an internal volume of 1 cubic foot.

Second, the connected oven 100 can confer increased control over thermal distribution and/or thermal gradients within the cavity. In particular, the connected oven 100 can be dynamically controlled by a processing system 500 (on-board or remote). The processing system 500 can dynamically adjust individual convection elements 400, heating elements 300, or other oven components to accommodate for cooking parameter deviations from a target value, create desired thermal profiles within the cavity interior, or otherwise selectively control oven operation.

Third, the connected oven 100 can substantially continuously monitor the foodstuff 10 cooking within the cavity. For example, the connected oven 100 can record a video of the cooking foodstuff and stream the video to a remote device (e.g., the server or user device). This can enable a user to share audio and video of the cooking session on a social networking system or any other suitable media sharing system. This can additionally enable foodstuff analysis. For example, the oven 100, remote system, or other computing system can automatically determine the cooking stage of the foodstuff 10, automatically determine the cooking preferences (e.g., doneness, crispness, etc.) of the user associated with the foodstuff 10 (primary user), automatically determine the cooking preferences of a user population, automatically determine the oven operation parameters or patterns that lead to a given cooking outcome, automatically control oven operation based on the operation states of other connected devices, automatically analyze and generate notifications based on an instantaneous or projected cooking parameter (e.g., estimated time to finish), or automatically determine any other suitable set of cooking parameter values.

Fourth, the connected oven 100 can facilitate organic, crowdsourced groundtruth generation through typical oven use, which can be used to refine the foodstuff 10 analyses modules over time. For example, the connected oven 100 can prompt users to generate a supervised set of training data through typical connected oven use. In one example, the oven 100 can analyze the foodstuff 10 within the cooking cavity 200 and suggest one or more food classes that the foodstuff 10 potentially falls into, based on one or more foodstuff recognition modules. Upon user confirmation of the recommended food class (or user selection of the food class for the foodstuff 10), the system can reinforce or recalibrate the foodstuff recognition modules based on the user selection and data used to initially recognize the foodstuff 10 (e.g., image). These updated foodstuff recognition modules can then be used for subsequent foodstuff analysis in one or more ovens, and become more refined with each instance of oven use.

Fifth, the connected oven 100 can facilitate a more compelling user experience by performing time-sensitive processes on the oven itself, while performing time-agnostic or long-term analyses on a remote computing system. This can have the additional benefit of leveraging the larger computing power of the remote computing system. The system can confer this benefit by performing the foodstuff 10 analyses in near-real time (e.g., recognize the foodstuff 10 within the oven 100 almost immediately after the foodstuff 10 has been inserted into the oven 100), wherein the oven 100 can recognize the foodstuff 10 using foodstuff recognition modules stored on-board the oven 100. The system can additionally or alternatively confer this benefit by including dedicated hardware (e.g., chipsets) for repetitive tasks. In a specific example, the oven 100 includes a dedicated dewarping chipset that automatically dewarps or otherwise processes the image recorded by the camera prior to analysis. The system can additionally or alternatively confer this benefit by determining cooking element instructions and controlling cooking element operation at the oven 100 (e.g., based on recipes stored by the oven 100), which can decrease cooking mistakes stemming from connection lag. However, the system can otherwise provide a compelling user experience.

Sixth, the connected oven 100 can be more aesthetically pleasing than conventional ovens. Some oven variations can include an edge to edge glass door that functions to provide a larger, clearer cavity viewing area. The glass can additionally be untinted or otherwise colored to facilitate clearer viewing. The oven 100 can additionally make the cooking food look better for exterior viewing and/or video recording. For example, the oven 100 can include: adjustable-color or specific-color cavity lighting (e.g., white, cool white, etc.); a black cavity background (which can additionally facilitate temperature control); curved edges, which can confer a more uniform imaging background; or control any other suitable visual or audio parameter. In a specific example, the lighting element can be a set of LEDs, which can confer the additional benefit of emitting a substantially negligible amount of heat, thereby enabling finer temperature control. The oven 100 can additionally include an aesthetically minimal, single linear wall bumper along the back wall, arranged proximal the center of the bottom edge. The oven 100 can additionally include a notification indicator. In one variation of the oven 100, the notification indicator (e.g., an LED) illuminates the support surface (e.g., countertop) instead of directing light at the user. This can result in a less intrusive, friendlier user experience.

Seventh, the connected oven 100 can be easier to clean than conventional ovens. The connected oven 100 can include a removable tray, a removable inner door wall (e.g., the inner door glass), curved or radiused cavity and bezel corners (wherein the corners can be concave, convex, or have any other suitable profile), or any other suitable cleaning feature. However, the features of connected oven 100 can confer any other suitable benefit over conventional ovens.

1.2 Auxiliary Systems.

The oven 100 is preferably used with a remote computing system (remote system). The remote system can be a server system, mobile device, desktop, tablet, laptop, or any other suitable remote system. The servers can be stateless, stateful, or have any other suitable configuration or property.

The oven 100 can additionally be used with a user device 30. The user device 30 can be a mobile device (e.g., a laptop, tablet, phone, smartwatch, etc.), substantially static device (e.g., desktop, television), or be any other suitable device. The user device can include user output (e.g., display, speakers, etc.), user input (e.g., touchscreen, microphone, etc.), communication module (e.g., wireless communication module), or any other suitable component. The user device can be associated with a user device identifier, user account, or any other suitable identifier for the user device itself or the user associated with the user device. The user device can be indirectly connected to the oven 100 (e.g., through the remote computing system), directly connected to the oven 100 (e.g., through BLE, NFC, WiFi, etc.), or be otherwise connected to the oven 100. The user device can communicate with the oven 100 through an application executed by the user device, such as a native application, browser application, part of the operating system, or any other suitable application. The application can have access to user device information (e.g., location, proximity, user account information, user device identifiers, calendars, social networking systems, etc.), beacon information, or any other suitable information.

The oven 100 can additionally be used with an auxiliary connected system, such as a temperature control system, lighting system, door lock, oven 100, or any other suitable auxiliary system. Alternatively, the user device, auxiliary connected systems, or any other suitable system can function as the remote computing system, such as in a distributed network system. The oven 100 is preferably wirelessly connected to the remote system, user device, auxiliary system, or other endpoint, but can alternatively be connected to the endpoint via a wired connection. In one variation, the oven 100 can be wirelessly connected to the remote computing system through a long-range connection (e.g., WiFi, cellular, LTE, etc.), wirelessly connected to a user device through a short-range connection (e.g., NFC, BLE, Bluetooth, etc.), and/or wirelessly connected to an auxiliary system through a mesh network. However, the oven 100 can be otherwise connected to any other suitable endpoint.

1.3 Cooking Lumen.

Figure 4:
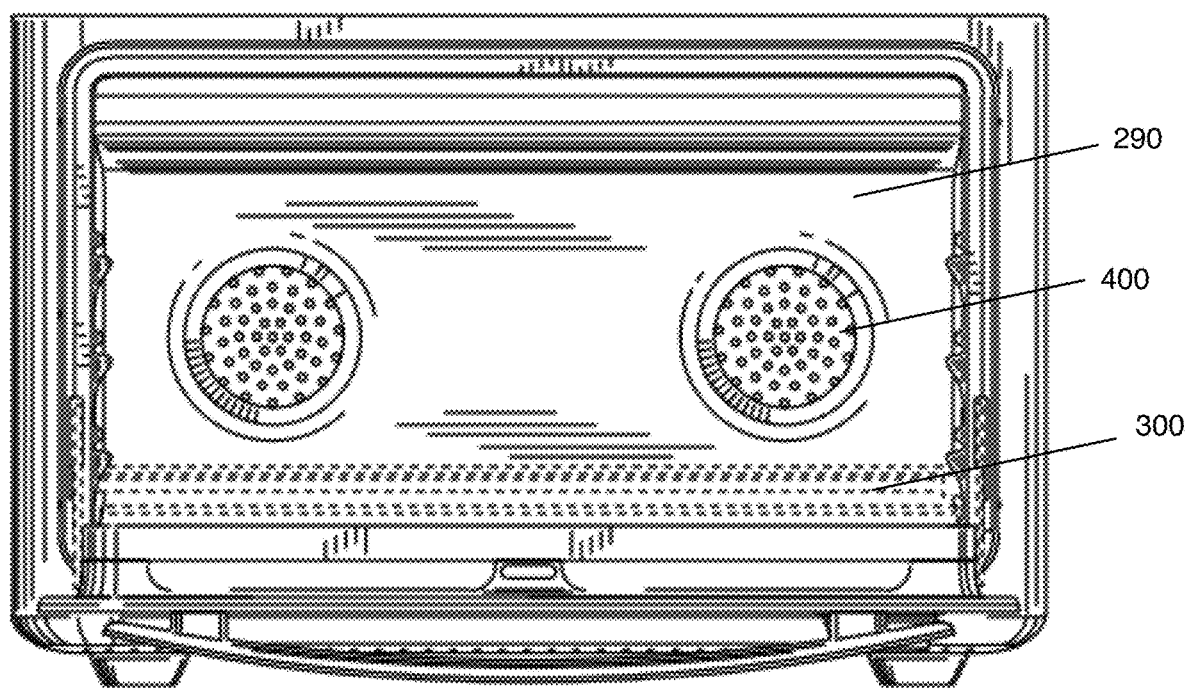
FIG. 4 is a variation of the cooking cavity.

As shown in FIG. 4, the cooking lumen functions to provide a substantially thermally insulated environment for cooking foodstuffs (e.g., cooking cavity 200). The cooking lumen is preferably cooperatively defined by an oven body and a door, but can be otherwise defined. The oven body can be defined by a set of oven walls (top, base, lateral sides, back), wherein the oven walls are preferably planar and meet at perpendicular junctions (corners). The corners can be angled, radiused (curved, such as convex or concave toward the cooking cavity 200), or have any other suitable profile. However, the walls can be curved, wavy, include grooves or fins, or have any other suitable configuration, and meet in any other suitable manner. The oven walls can be made of metal, plastic, glass, ceramic, or any other suitable material or combination thereof.

The oven walls can include thermal insulation, such as vacuum insulated walls, foam insulation, molded insulation, an airgap between an inner and outer wall, or any other suitable insulation. In one variation, the oven walls can include an internal and external wall cooperatively forming an airgap therebetween. The oven walls can additionally include insulation mounted to the internal and/or external wall, within the airgap. The edges of the walls (e.g., extending between the internal and external walls) can be closed (e.g., blind, fluid impermeable, sealed) or open to the cooking cavity 200, adjacent airgap, and/or oven 100 exterior (e.g., to form an exhaust or fluid connection). However, the oven walls can be otherwise configured.

In one example, the back wall includes an internal and external wall cooperatively defining an air channel therebetween, wherein the internal wall includes one or more channels extending proximal the oven top 230, oven base 250, and/or oven side 270 walls, such that the air channel is fluidly connected to the cooking cavity 200 through the channels. In operation, fans mounted to the back wall can draw air into the air gap through the fan, and exhaust the air through the channels back into the cooking cavity 200 (e.g., over the heating elements 300). However, cooking cavity 200 air can be otherwise redirected.

The cavity walls can be black (e.g., matte black), white, have any other suitable solid color, or have any other suitable combination of colors and/or patterns. The cavity walls along the cooking lumen can additionally be reflective (e.g., to facilitate faster preheating times and more even cooking heat distribution), low-reflectance (e.g., coated with a low-reflectance coating), smooth, brushed, rough, or have any other suitable surface. The oven tray, rack, and/or other oven components can have the same color and/or surface texture, which can facilitate faster image processing for foodstuff 10 analysis.

The door of the cooking lumen functions to actuate relative to and transiently seal against the oven body to form a substantially thermally insulated cavity. The door is preferably transparent (e.g., optically connecting the ambient environment with the cooking cavity 200), but can be translucent, opaque, or have any other optical property. The door is preferably substantially planar and seals against the edges of the top, bottom, and lateral side walls, but can have any other suitable configuration and otherwise couple to the oven walls. The door can be made of glass, plastic, metal (e.g., perforated metal, solid metal), or any other suitable material or combination thereof. In a specific example, the entirety of the door is glass except for a metal bezel around the door edge, wherein the metal bezel does not substantially impinge upon the broad face of the door. The door can additionally include thermal insulation, such as vacuum insulated walls, foam insulation, an air gap cooperatively defined between an inner and outer door wall, or any other suitable insulation. The air gap can additionally function to thermally insulate components on the outer door wall from radiation (e.g., heat) within the cavity. The door can be mounted to the oven body along a lateral edge, a longitudinal edge, or along any other suitable edge.

Figure 6:
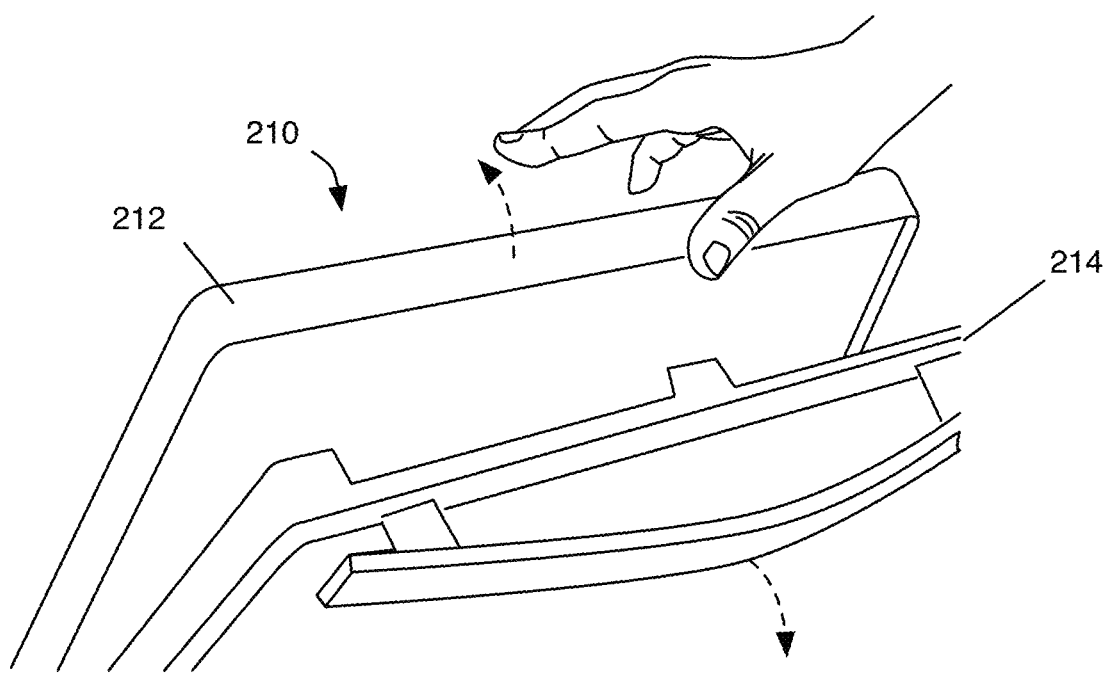
FIG. 6 is an example of dual-panel oven door, including a first panel removably couplable to a second panel.
Figure 10:
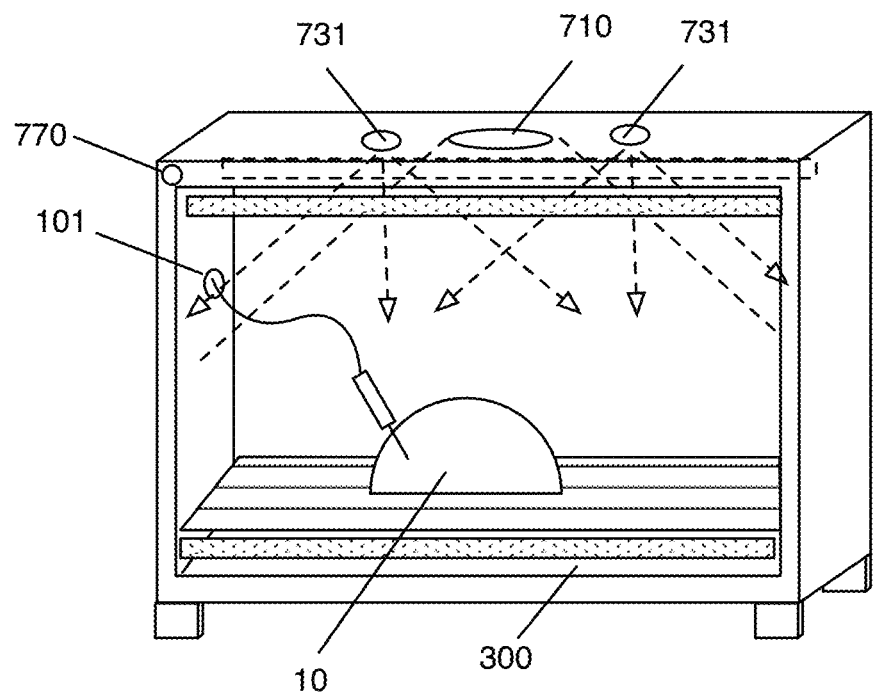
FIG. 10 is a schematic representation of a variation of the oven including a camera, light emitting elements, and an electrical connector.
Figure 11:
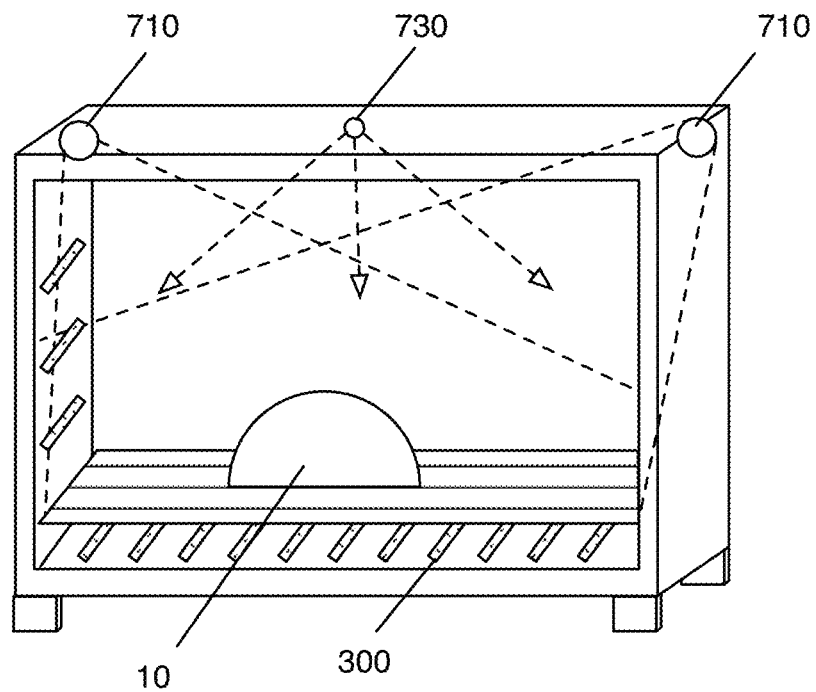
FIG. 11 is a schematic representation of a variation of the oven including a first and second camera.
Figure 12:
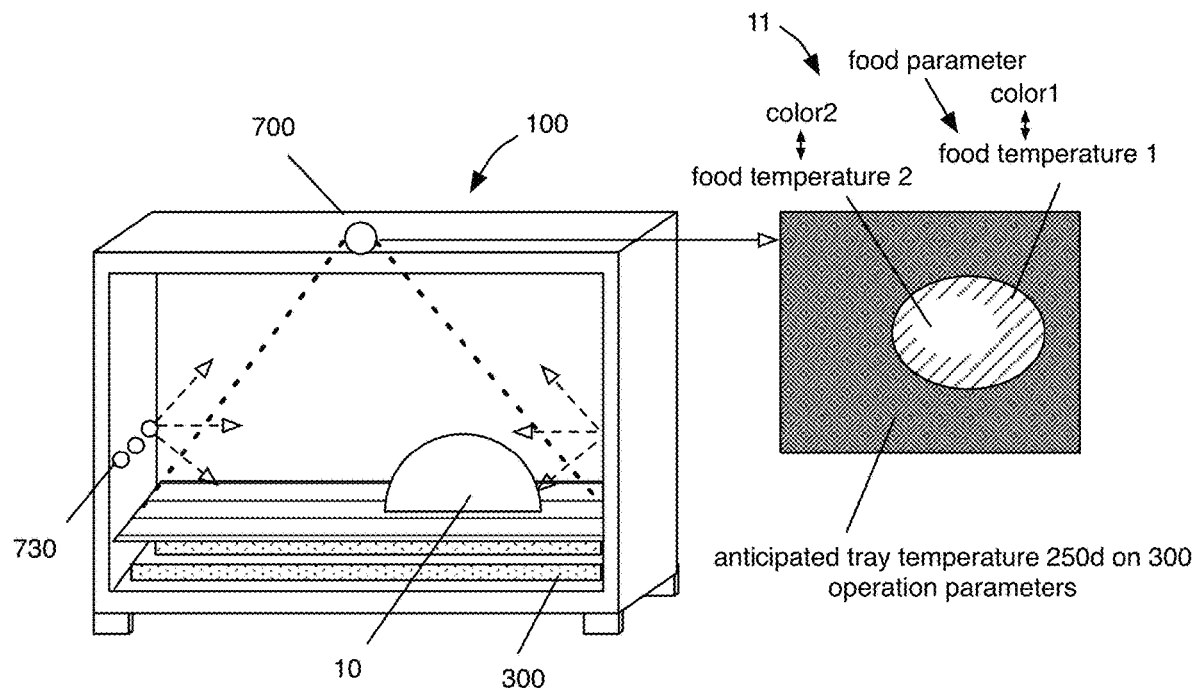
FIG. 12 is a schematic representation of a variation of the oven including a thermal camera.
Figure 13:
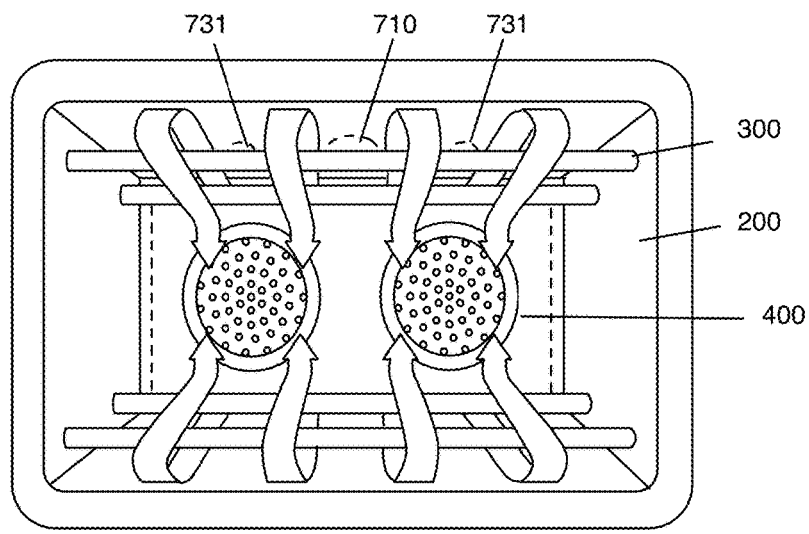
FIG. 13 is a schematic representation of airflow through the cooking cavity.
Figure 17:
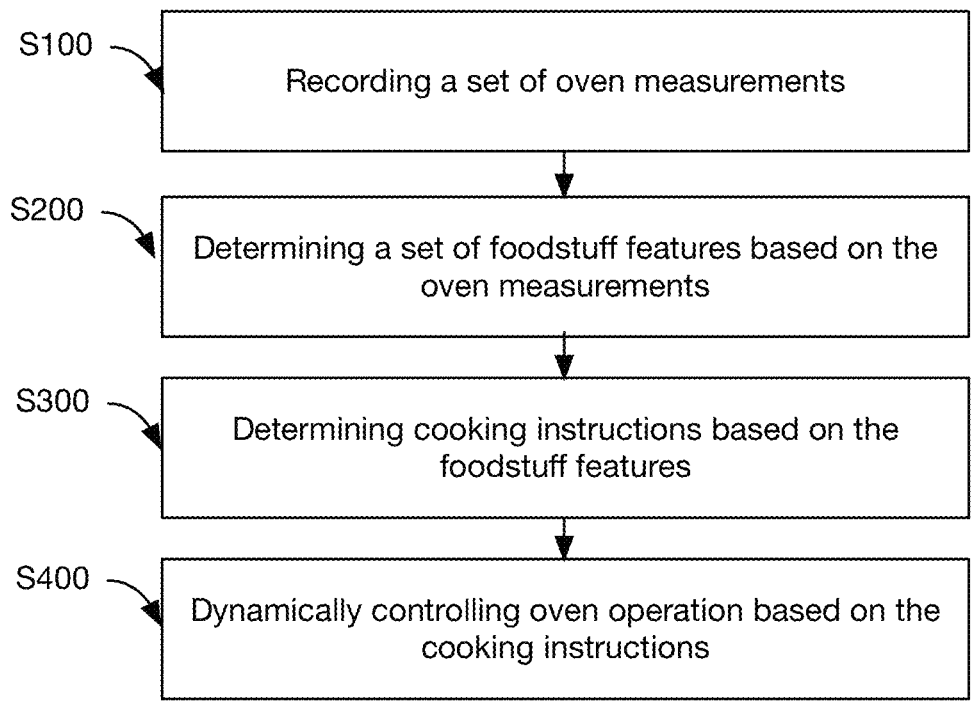
FIG. 17 is a schematic representation of the method of oven operation
Figure 18:
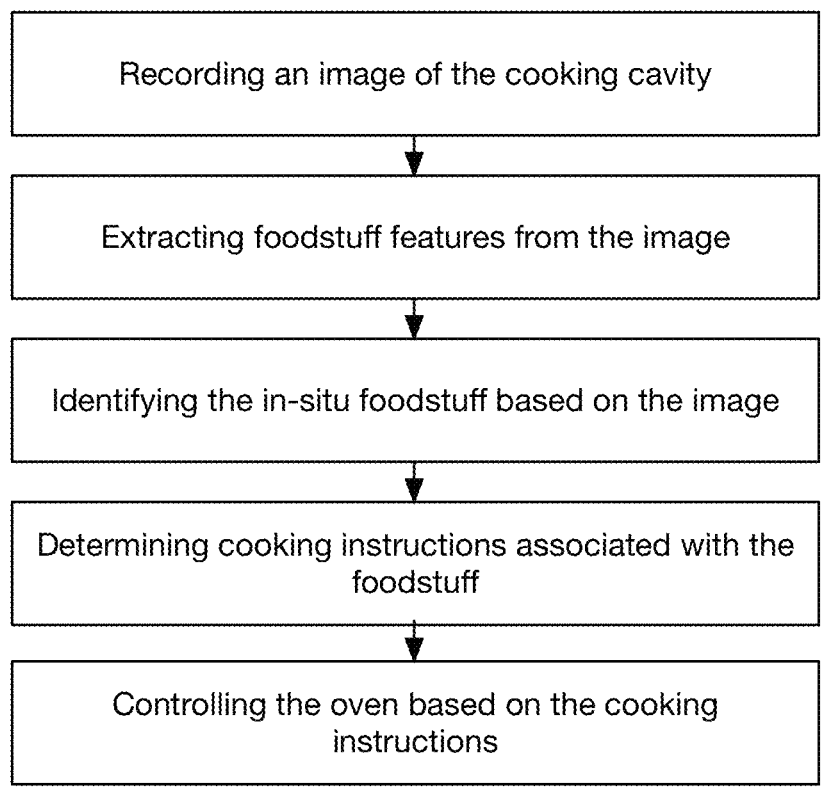
FIG. 18 is a schematic representation of a variation of the method.
Figure 19:
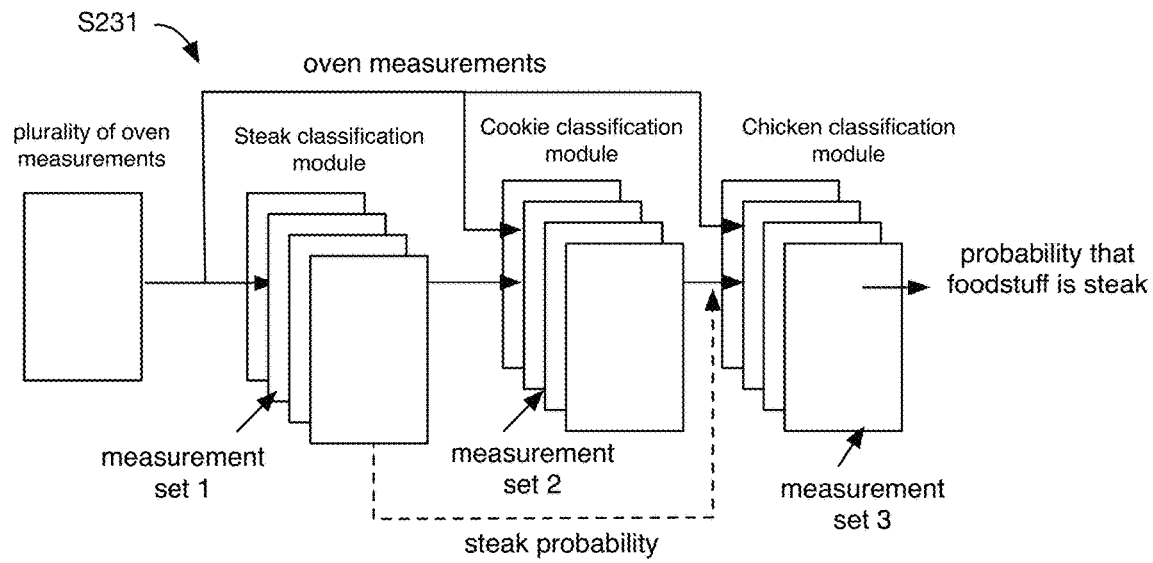
FIG. 19 is a schematic representation of a variation of the identification module.
Figure 20:
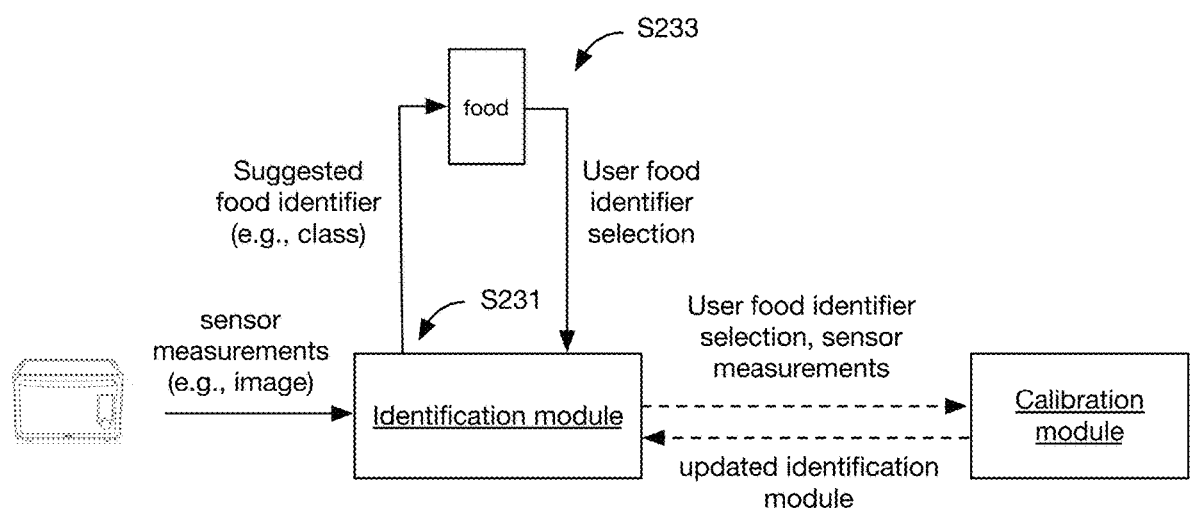
FIG. 20 is a schematic representation of a variation of identification module use and updating.
Figure 21:
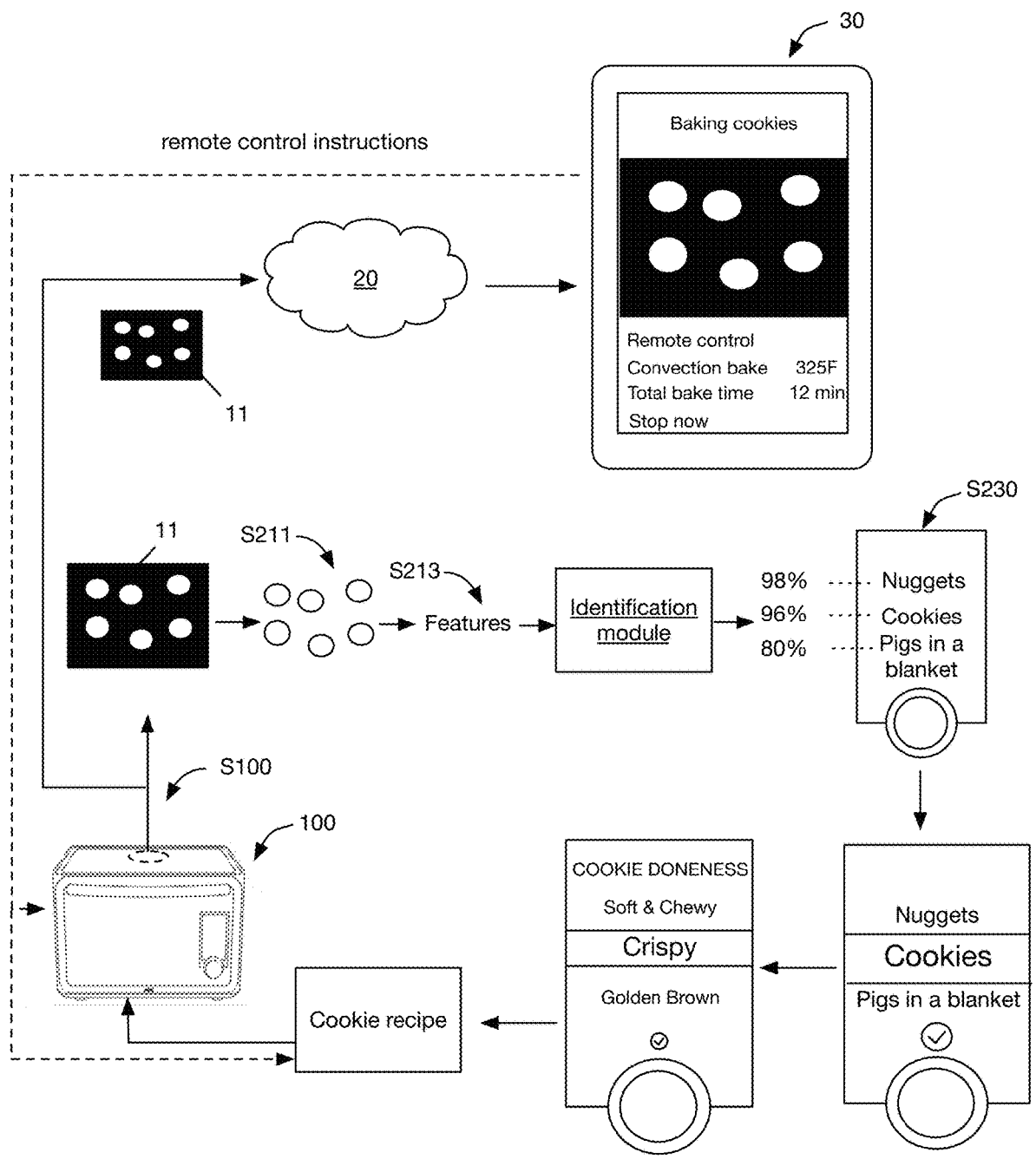
FIG. 21 is an example of the method.
Figure 22A:
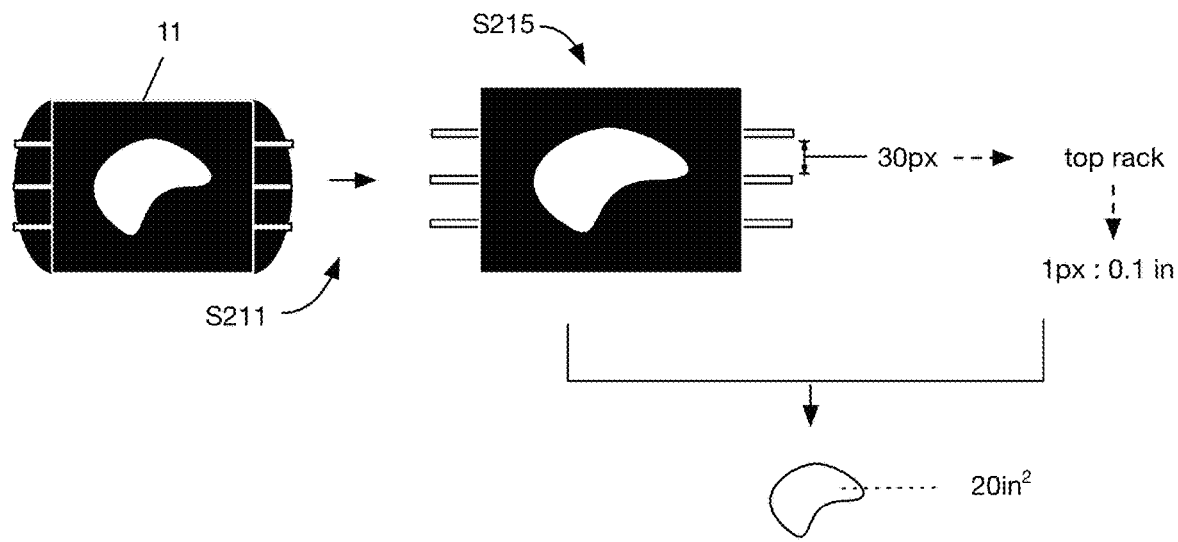
FIGS. 22A and 22B are examples of determining the food size and height from a first and second image, respectively.
Figure 22B:
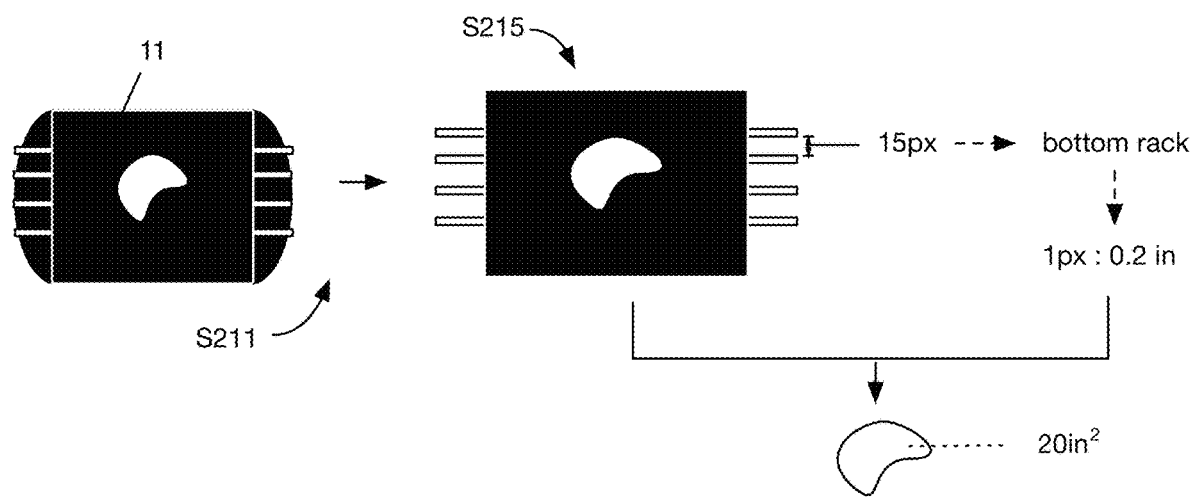
Figure 23:
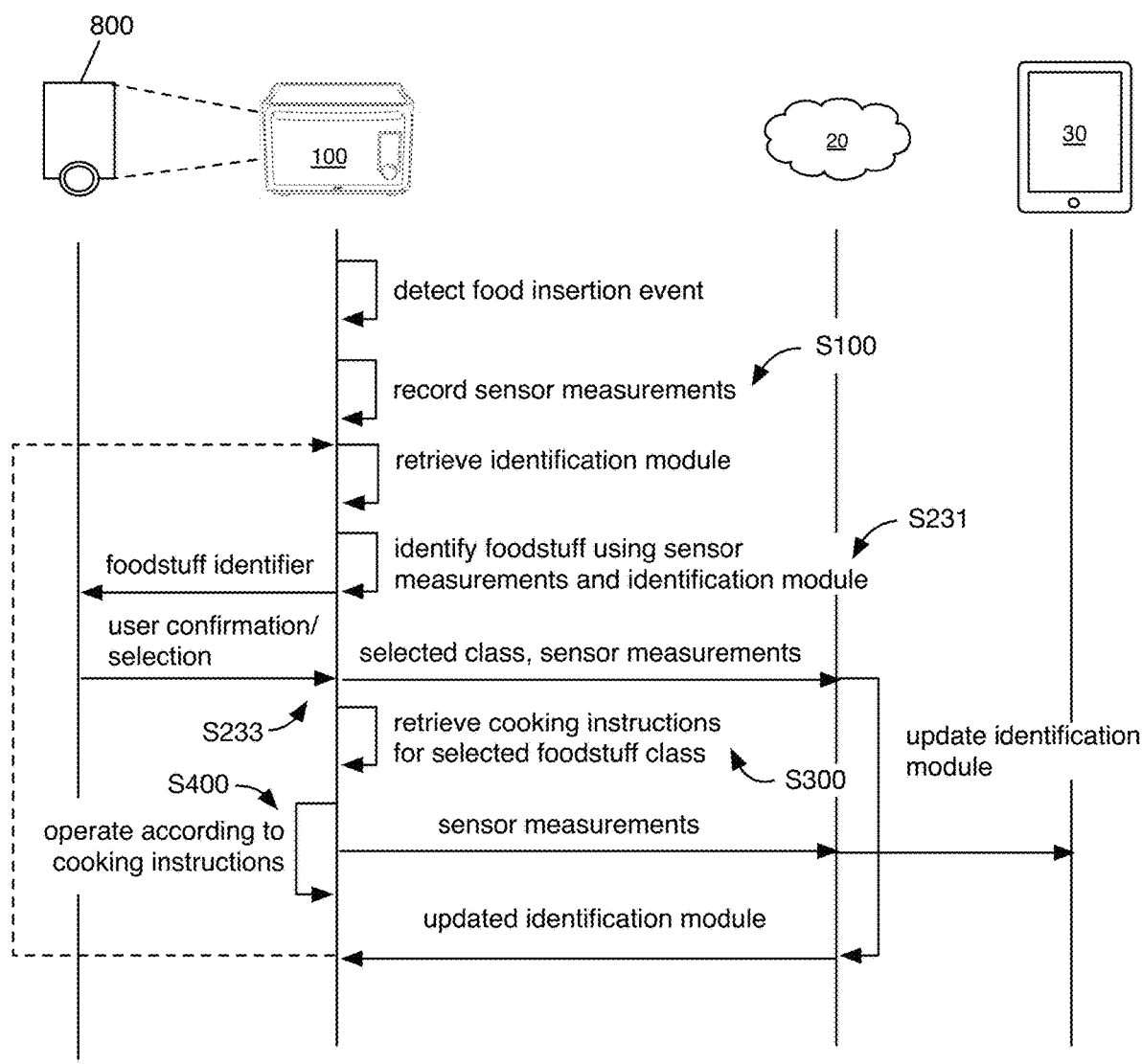
FIG. 23 is a schematic representation of a first variation of operation.
Figure 24:
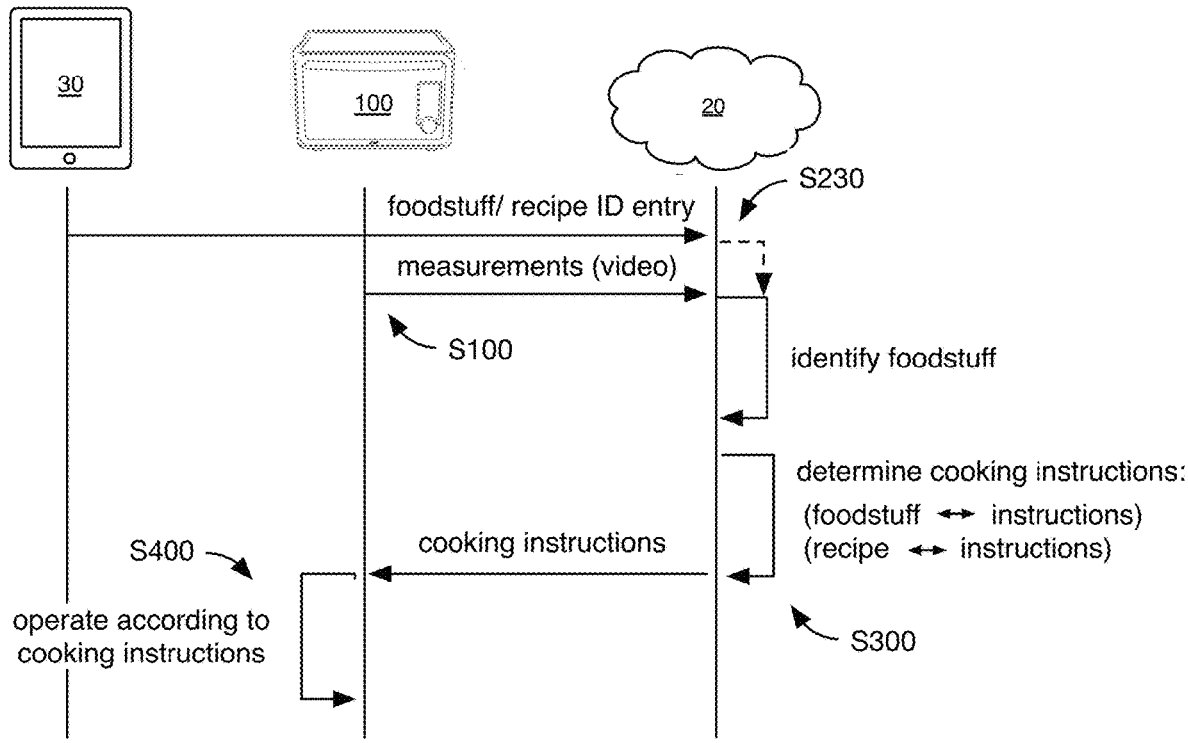
FIG. 24 is a schematic representation of a second variation of oven operation based on cooking instructions determined from a recipe or from the cooking foodstuff, as determined from the measurements.

In one variation, examples shown in FIG. 6, FIG. 7, FIG. 8, the door is a dual-panel door, and includes an inner and outer panel aligned in parallel (e.g., wherein the outer panel 214 defines a first broad face and a first normal vector, wherein the inner panel 212 defines a second broad face and a second normal vector, and wherein the outer panel 214 is coupled to the inner panel 212 with the first and second normal vectors substantially coaxially aligned) and offset by an air gap. The air gap can function as thermal insulation for the user input 830 (e.g., the touchscreen), a thermal path for component cooling, or perform any other suitable functionality. The inner panel 212 can be removably coupled to the outer door wall to enable inner wall removal for cleaning. The inner panel 212 can be coupled to the outer panel 214 by a coupling mechanism 216. The coupling mechanism 216 can be arranged at the corners of the door, along a first and second edge of the door (opposing or adjacent), along a portion of the bezel, along the broad face of the door, or along any other suitable portion of the door. The coupling mechanism can be clips, magnetic elements, screws, a tongue and groove system (e.g., wherein the inner door wall slides into a groove defined by the bezel of the outer door wall), or be any other suitable coupling mechanism. The oven 100 can include one or more coupling mechanisms of same or different type, evenly or unevenly distributed along the door (e.g., along the door perimeter). In one example, the inner panel 212 includes a magnetic element (e.g., a magnetic bezel) that magnetically couples to the interior surface of the outer panel 214 and offsets the inner panel 212 from the outer panel 214. The outer panel 214 can additionally include a bezel extending along the outer panel 214 perimeter, wherein the inner panel 212 bezel can couple to the outer panel 214 along the outer panel bezel edge, to the outer panel 214 broad surface within the outer panel bezel, or to the outer panel 214 broad surface outside the outer panel bezel. However, the inner panel 212 can be substantially permanently mounted to the outer panel 214 (e.g., welded, formed as a singular piece, etc.) or be otherwise coupled to the outer door wall. However, the door can be otherwise constructed.

The inner and outer panel can both include transparent windows, wherein the transparent windows are preferably aligned to cooperatively form a transparent window for the door. However, the respective transparent windows can be offset or otherwise arranged. The transparent windows (e.g., transparent regions) can be coextensive with the cooking cavity 200, but can alternatively be larger or smaller. In one example, the inner and outer panels both include edge-to-edge glass. The visual transmittance of the inner and outer panels are preferably substantially equal (e.g., transmit 100%, 90%, 80%, 50%, or any other suitable proportion of the incident radiation), but can alternatively be different (e.g., wherein the inner and/or outer panels can be tinted to different degrees). The reflectivity of the inner and outer panels are preferably substantially similar (e.g., low, high, etc.), but can alternatively be different. The refraction index of the first and/or second panel is preferably low (e.g., with a refractive index of 1, 1.5, 2, etc.), but can alternatively be high (e.g., refraction index of 3, 4, 5, etc.) or have any other suitable value. All or a portion of the inner and/or outer panels can additionally include anti-glare coatings, reflective coatings (e.g., to reflect light in the visual spectrum, in the IR spectrum, in the UV spectrum, in the microwave spectrum, etc.), or any other suitable type of coating or treatment embedded within the panel, on a panel interior surface, or on a panel exterior surface. In one variation, all or a portion (e.g., center, edges, etc.) of the inner and/or outer panels can include a coating that minimizes infrared transmission (e.g., out of the cooking cavity). The coating can be IR reflective or have any other suitable characteristic. The coating can be made of metal oxide (e.g., tin oxide, zinc oxide, cadmium stannate, $Fe_2O_3$, $Cr_2O_3$, ZnS, $Sb_2O_3$, $ZrO_2$, etc.), polymer (e.g., PVDF), sol-gel, or made of any other suitable material. However, the inner and outer panels can be otherwise constructed, arranged, and/or have any other suitable property or feature.

1.4 Heating Elements.

As shown in FIG. 4, the heating elements 300 of the oven 100 function to heat portions of the cavity. The heating elements 300 can additionally or alternatively function as cooling elements. The heating elements 300 can be resistive, chemical, Peltier, inductive, or utilize any other suitable heating mechanism. The heating elements 300 can be metal, ceramic, carbon fiber, composite (e.g., tubular sheathed heating element, screen-printed metal-ceramic tracks, etc.), combination (e.g., thick film technology, etc.), or be any other suitable type of heating element. The oven 100 can include one or more heating elements 300 (e.g., 4, 6, 8, etc.), wherein all heating elements 300 are preferably substantially identical but can alternatively be different. Each heating element can be individually addressed and controlled, controlled as a subset (e.g., controlled with a second heating element), controlled as a population (e.g., wherein all heating elements 300 are controlled together), or controlled in any other suitable manner. The heating element(s) are preferably controlled by the processor, but can be controlled by a secondary on-board processor, remotely controlled by the user device or remote system, or be otherwise controlled.

The heating elements 300 can be linear, curved (e.g., boustrophedonic), circular, or otherwise configured. The heating element can be arranged along the oven 100 bottom, sides, top, back, front (e.g., in the door bezel), corners, and/or along any other suitable cavity surface, or be arranged proximal but offset from the respective cavity surface. In one example, the oven 100 can include a heating element proximal a convection element (e.g., fan), wherein the heating element can superheat the air circulated by the convection element. In a specific example, the oven 100 can include a circular heating element concentric with the fan. The heating elements 300 are preferably substantially symmetrically distributed along the respective cavity surface, but can alternatively or additionally be evenly distributed, unevenly distributed, asymmetrically distributed, or otherwise distributed along the cavity surface. The heating elements 300 can be raised above the cavity surface, arranged behind the cavity surface (e.g., distal the cavity across the cavity surface, within the wall, etc.), be flush with cavity surface (e.g., integrated into the cavity surface), arranged proximal the sensors or light emitting elements (e.g., bracket the sensors and/or light emitting elements), arranged proximal one or more surfaces (e.g., oven top 230, oven 100 bottom, oven sides 270, etc.), or be otherwise arranged. The heating elements 300 can be statically mounted to the cavity surface, removably mounted to the cavity surface (e.g., by clips, pins, magnets, etc.), or be otherwise coupled to the oven 100. The heating elements 300 can be covered by a heatsink or thermal diffuser (e.g., a thermally conductive sheet), which can function to more evenly distribute heat within the cooking cavity 200. Alternatively, the heating elements 300 can remain uncovered. In one specific example, the oven 100 can include six linear heating elements 300, three arranged lengthwise along the oven base 250 and three arranged lengthwise along the oven top 230, wherein the heating elements 300 are substantially evenly distributed along the cavity depth.

1.5 Convection Elements.

Figure 2:
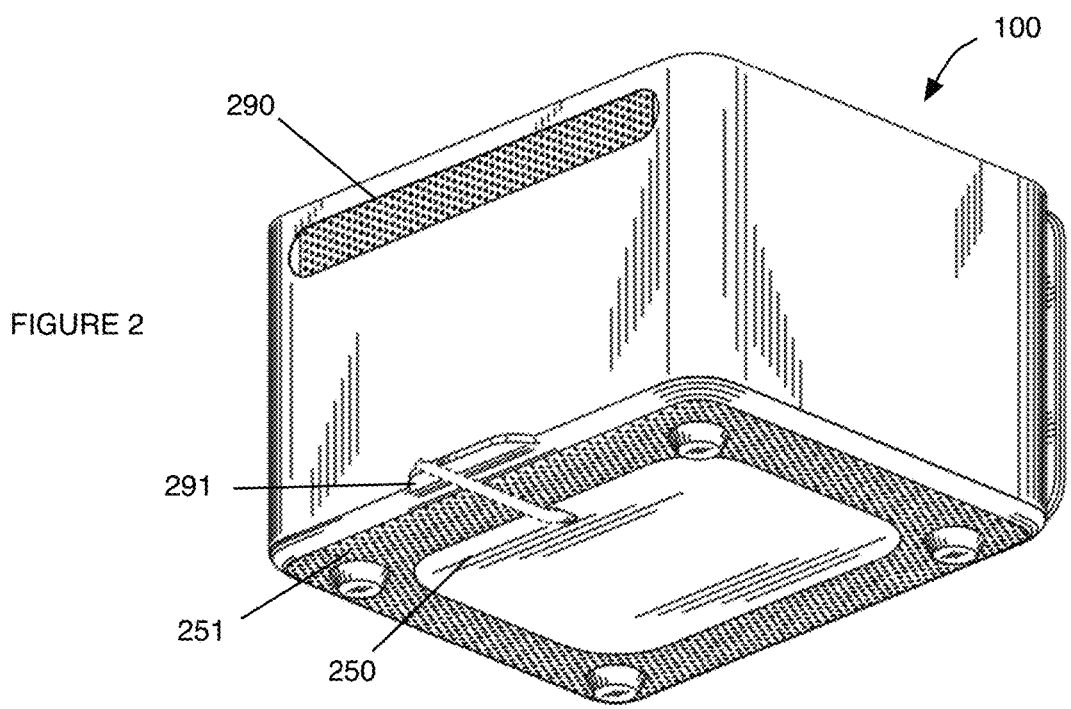
FIG. 2 is an isometric view from the bottom left of a variation of the variation.
Figure 3:
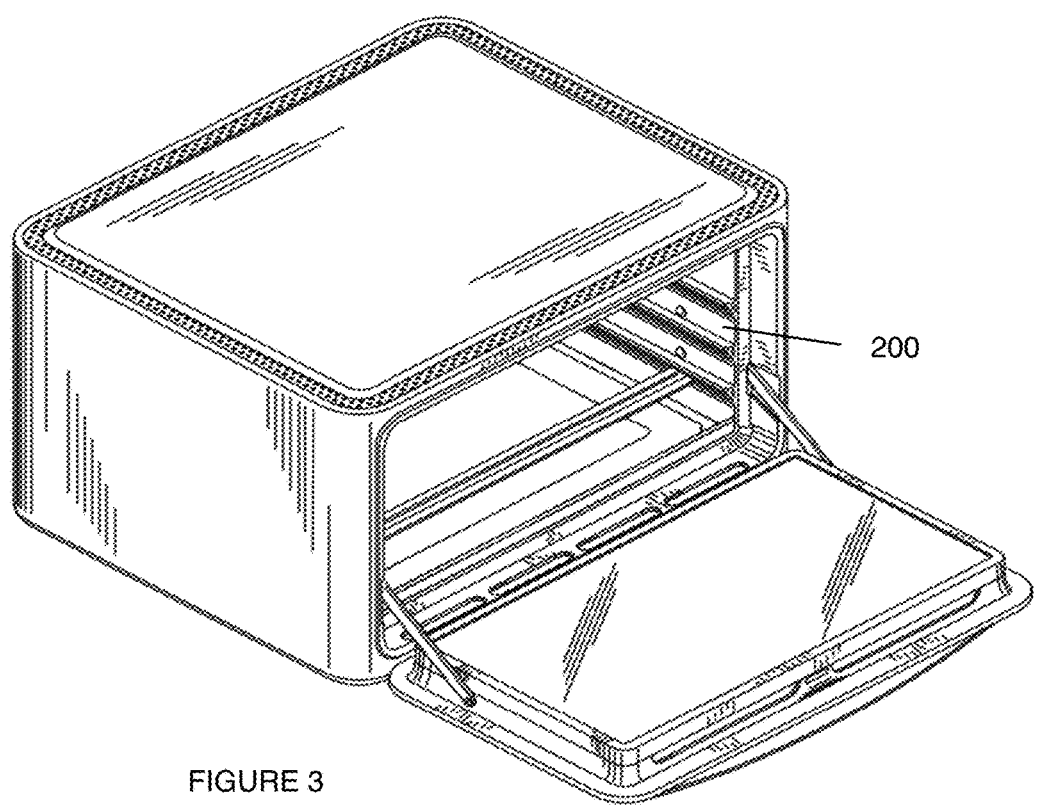
FIG. 3 is a variation of the oven in an open configuration.

The convection elements 400 of the oven 100 function to distribute heat about the foodstuff 10 and/or within the cavity. The convection elements 400 can additionally function to cool sensor components (e.g., the camera, LED, etc.), cool the cavity (e.g., exhaust air out of the oven 100), or otherwise move fluid within the cavity, into the cavity, or out of the cavity. Alternatively, the oven 100 can be an impingement oven (e.g., wherein the convection elements 400 blow hot air into the cavity), a radiation oven (e.g., wherein the oven 100 lacks convection elements 400 and/or facilitate natural convection), or be any other suitable type of oven 100. The convection elements 400 can be fans, Peltier elements, chemical reactions, fins, air manifolds, pumps, or any other suitable mechanism capable of moving fluid. The convection elements 400 can be active or passive. The fan can be an axial flow fan, centrifugal fan, cross-flow fan, or any other suitable fan. The fan can be a cone fan, arranged with the apex proximal the cavity interior; a box fan; or be any other suitable type of fan. The fan can be the same thickness as the oven wall (e.g., single wall, composite wall with an inner and outer wall, etc.), be thicker than the oven wall, or be thinner than the oven wall. In one example, as shown in FIGS. 1 and 2, the oven wall can include an inner and outer wall cooperatively defining an air manifold therebetween. The fan can be mounted to the inner wall, and be fluidly connected to the air manifold at one end and the cavity at the other. The fan can be thicker than the inner wall, and extend into the cavity. Alternatively, the fan can extend outward of the oven 100, be thinner than the air manifold, or have any other suitable configuration.

The convection element can be arranged along the back wall (as shown in FIG. 4), side wall(s), top, bottom, front, or any other suitable portion of the cavity. The oven 100 can include one or more convection elements 400, wherein all convection elements 400 are preferably substantially identical but can alternatively be different. Each convection element can be individually controlled, controlled as a subset (e.g., controlled with a second heating element), controlled as a population (e.g., wherein all heating elements 300 are controlled together), or controlled in any other suitable manner. The convection element(s) are preferably controlled by the processor, but can be controlled by a secondary on-board processor, remotely controlled by the user device or remote system, or be otherwise controlled. The convection elements 400 are preferably symmetrically arranged about the cavity, but can alternatively or additionally be evenly distributed, unevenly distributed, asymmetrically distributed, or otherwise distributed about the cavity. The convection elements 400 can be raised above the cavity surface (e.g., be arranged within the cavity), arranged behind the cavity surface (e.g., distal the cavity across the cavity surface, within the wall, etc.), be flush with cavity surface (e.g., integrated into the cavity surface), or be otherwise arranged. The convection elements 400 can be statically mounted to the cavity surface, removably mounted to the cavity surface (e.g., by clips, pins, magnets, etc.), or be otherwise coupled to the oven 100. In one specific example, the oven 100 can include two convection elements 400, each arranged on the back cavity wall, substantially equidistant from a lateral (e.g., vertical) back cavity wall axis. However, the convection elements 400 can be otherwise arranged. The oven 100 can additionally or alternatively include air manifolds, air inlets, air outlets, vents, or any other suitable fluid aperture to facilitate airflow within the cavity.

1.6 Processing System 500.

The processing system 500 of the oven 100 functions to record sensor measurements, process sensor measurements, control communication between the oven 100 and secondary system (e.g., remote system, user device, etc.), control oven component operation based on recipe instructions, and/or control oven component operation based on user input received at the user interface unit. The processing system 500 preferably individually controls the oven components (e.g., wherein the components are individually indexed), but can alternatively control like components together. The processing system 500 can additionally or alternatively function to automatically determine a classification for foodstuff 10 within the cooking cavity 200 (e.g., based on an foodstuff 10 features extracted from sensor measurements), automatically oven component operation based on the classification, or perform any other suitable functionality. The processing system 500 can be the same as that driving the user interface unit, or be a separate and distinct processor connected to that driving the user interface unit. The processing system 500 can include one or more processors, wherein the processor can be a PCB, CPU, GPU, or any other suitable processing or computing system.

The processing system 500 can additionally include one or more pieces of computer memory (e.g., non-volatile memory, such as RAM or Flash; volatile memory, etc.) that functions to store: a set of recipes for each of a plurality of food classes, image processing modules (e.g., one or more: segmentation modules, identification modules, pixel-to-physical area maps, etc.), foodstuff analysis modules (e.g., time-to-finish estimation modules, cooking element control instruction adjustment modules, etc.), user preferences, foodstuff 10 history, or any other suitable data. The data stored by the computer memory can be static, updated by the processing system 500 (e.g., in response to receipt of updated data from the remote computing system), or otherwise changed at any other suitable frequency.

The processing system 500 is preferably electrically or wirelessly connected to every active oven component (e.g., the heating elements 300, convection elements 400, user inputs, display, sensors 700, light emitting element, memory, electrical connectors, etc.), but can alternatively be connected to a subset of the active oven components. In one example, the processing system 500 is connected to the active oven components over a controller area network (CAN) bus. The processing system 500 can be mounted to the oven body (e.g., top, base, walls, etc.), door, or any other suitable oven component. When the processor is mounted to the door, the bus (e.g., cable, wires, pins, etc.) can extend along the door broad face (e.g., along the bezel) to connect to the remainder of the active oven components. However, the processor can be otherwise physically connected to the active oven components. The processor can be part of the user interface unit or be a separate component. In one variation, the processor is mounted to the display 810. In a second variation, the processor is mounted to the oven 100 with a processor normal vector intersecting the cooking cavity 200. In a third version, the processor is mounted to the knob. However, the processor can be otherwise mounted.

1.7 Communication System.

The communication system 600 of the oven 100 functions to receive and/or transmit information. The communication system 600 can be electrically connected to the processor or oven components, wirelessly connected to the processor or oven components, or be otherwise connected to the processor or oven components. The communication system 600 can be wired or wireless. The communication system 600 can be WiFi, cellular, Zigbee, Z-wave, NFC, BLE, RF, mesh, radio, or any other suitable communication system. The communication system 600 can include a transmitter, a receiver, or both. The communication system 600 can include one or more antennas. The antenna bio can extend along the user interface unit, the processor, an oven wall, a door bezel, or along any other suitable component. The oven 100 can include one or more communication systems 600, wherein multiple communication systems 600 can be the same or different. The communication system 600 can be part of the user interface unit or be a separate component. The communication system 600 is preferably arranged within an oven wall, but can alternatively be arranged along a wall or door, within a wall or door, within the cavity, or in any other suitable location. The communication system 600 is preferably arranged along an outer wall, but can alternatively be arranged along an inner wall or along any other suitable portion of the communication system 600. The communication system 600 can be mounted directly to the oven 100, be mounted to the processor, be mounted to the display 810, be mounted to a user input, or be mounted to any other suitable oven component. In one variation, the communication system 600 is mounted to the oven 100 with a communication system normal vector intersecting the cooking cavity 200.

1.8 Sensors.

The sensors 700 of the oven 100 function to record cooking parameters. More specifically, the sensors function to monitor oven operation parameters and/or foodstuff parameters. The sensors 700 can include optical sensor 710 (e.g., image sensors, light sensors, etc.), audio sensors, temperature sensors, volatile compound sensors, weight sensors, humidity sensors, depth sensors, location sensors, inertial sensors (e.g., accelerators, gyroscope, magnetometer, etc.), impedance sensors (e.g., to measure bio-impedance of foodstuff), hygrometers, insertion temperature sensors (e.g., probes), cooking cavity 200 temperature sensors, timers, gas analyzers, pressure sensors, flow sensors, door sensors (e.g., a switch coupled to the door, etc.), power sensors (e.g., Hall effect sensors), or any other suitable sensor. The sensors can be directly or indirectly coupled to the cooking cavity 200. The sensors can be connected to and controlled by the processor, or be otherwise controlled. The sensors are preferably individually indexed and individually controlled, but can alternatively be controlled together with other like sensors.

In one variation, the sensor 700 can include an optical sensor 710 that functions to measure optical data about the cooking cavity 200 (e.g., foodstuff 10 within the cooking cavity 200). In a first embodiment, the sensor includes a camera configured to record images 11 or video of the cooking cavity 200 (e.g., food cooking within the cavity). The camera can be a CCD camera, stereocamera, hyperspectral camera, multispectral camera, video camera, wide angle camera (e.g., a fisheye camera with a fisheye lens, a rectilinear camera with a rectilinear lens, etc.) or any other suitable type of camera. In a specific example, the wide-angle camera can have an approximately 180-degree field of view (e.g., within 10 degrees or less). The camera can be cooled by the convection elements 400, cooled by a separate cooling system (e.g., a radiator and fan, watercooling, etc.), or remain uncooled. The camera can record images 11 using radiation emitted or reflected by the heating elements 300, by the foodstuff 10, by the oven walls, by an emitter, or by any other suitable radiation source. Alternatively or additionally, the camera can record images using ambient light.

The camera can additionally include dedicated processing hardware 711 that pre-processes the captured image 11. Examples of dedicated processing hardware include: dewarping hardware (e.g., to correct the distortion an image captured by a fisheye camera), mosaicing hardware (e.g., to stitch together multiple images recorded by one or more cameras into a single image, virtual 3D model, etc.), resizing hardware, filtering hardware, hardware that identifies image elements (e.g., identify a reference point, identify recurrent image elements, such as a rack), or any other suitable hardware. The dedicated processing hardware can be a generic chipset with the algorithm flashed onto the chipset (e.g., read-only), be a chipset with dedicated processing circuitry (e.g., wherein the algorithm is determined by the circuitry), or be any other suitable hardware. The dedicated processing hardware is preferably connected between the camera and processor in series, but can alternatively be connected in parallel or be otherwise connected.

The camera and/or any associated processing systems (e.g., chipsets) can be arranged along the top of the cavity (e.g., distal the heating elements 300, distal the feet, etc.), arranged along the side of the cavity, arranged along the bottom of the cavity, arranged in a corner of the cavity (e.g., upper right, upper left, etc.), arranged in the door of the cavity (e.g., supported by the inner door wall, supported by the outer door wall, be integrated into the user interaction unit, etc.), or be supported by any other suitable portion of the oven 100. Alternatively, the associated processing systems can be arranged separate from the camera (e.g., be part of the processing system, etc.). The camera lens is preferably flush with the cavity wall, but can alternatively be recessed or protrude from the cavity wall. The camera can be centered along the respective oven surface, offset from the oven surface center, or be arranged in any other suitable position. The camera can be statically mounted to the oven surface, movably mounted to the oven surface (e.g., rotate about a rotational axis, slide along a sliding axis, etc.), or be otherwise coupled to the oven 100. The oven 100 preferably includes one or more video cameras. The cameras can be substantially identical or be different. The cameras can be evenly distributed throughout the cavity (e.g., symmetrically distributed), or be unevenly distributed.

The camera can have a constant frame rate, variable frame rate, or any other suitable frame rate. In one variation, the frame rate can be dynamically adjusted to accommodate for the radiation from the foodstuff 10, ambient light, internally emitted light, or any other suitable light. The camera can be statically mounted to the oven 100, actuatably mounted to the oven 100 (e.g., rotate about an axis parallel to an oven 100 longitudinal axis, lateral axis, multi-direction, etc.), or otherwise mounted to the oven 100. The camera can dynamically apply one or more filters to single out a given set of light bands. The camera can dynamically apply one or more lenses to adjust the camera field of view or any other suitable optical parameter. The camera can additionally include a set of mirrors that selectively redirect radiation (e.g., light) or images to the foodstuff 10 and/or camera. The camera can have a static field of view, variable field of view, or other suitable field of view. The camera is preferably arranged with its field of view (FOV) directed at the cavity, but can alternatively be otherwise arranged. The FOV (single or combined) preferably substantially encompasses the entirety of the cavity, but can alternatively encompass a subset of the cavity or encompass any other suitable portion of the cavity. The FOV preferably encompasses at least the food tray or bottom of the cavity, but can additionally or alternatively encompass the front, back, walls, top, or any other suitable portion of the cavity. The camera is preferably sensitive to (e.g., measure in the spectral wavelength of) visual light, but can alternatively or additionally be sensitive to infrared light, ultraviolet light, or any other suitable electromagnetic wavelength.

Figure 5:
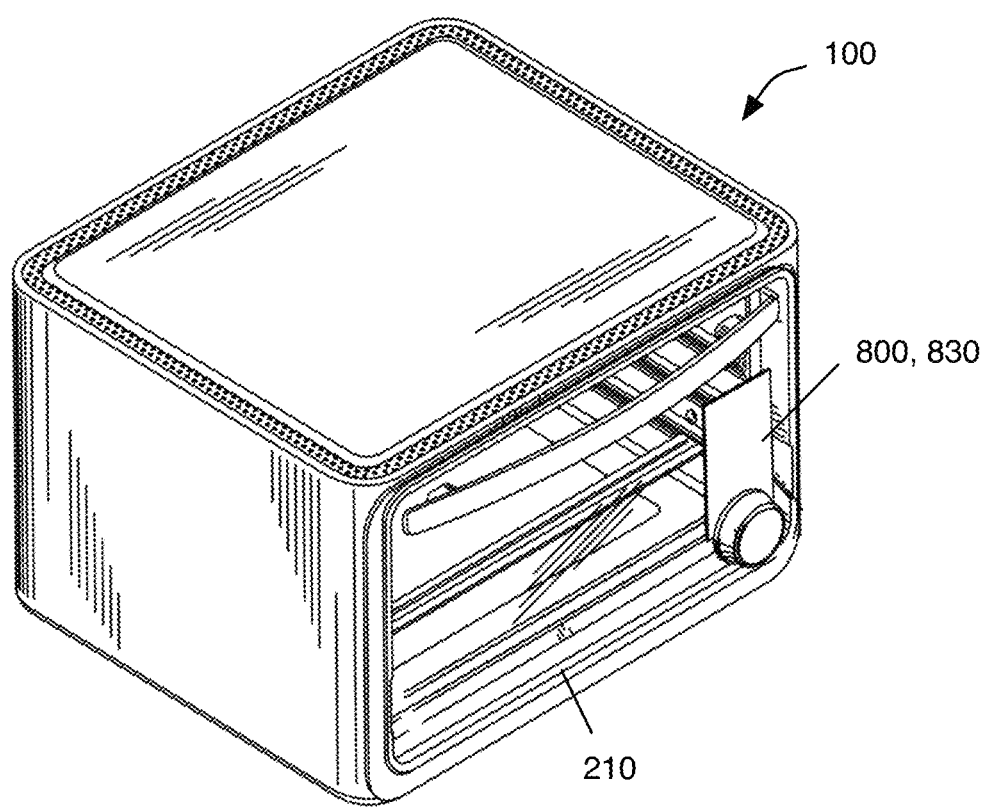
FIG. 5 is an example of an oven with a transparent door.

In a first variation, as shown in FIG. 6, the oven 100 includes a single camera mounted to the top of the cavity and directed with the FOV toward the cavity bottom. In a second variation, the oven 100 includes a single camera of limited view (e.g., wherein the FOV is less than a majority of the cavity), wherein the camera is directed toward a food pan (e.g., tray) proximal the heating elements 300. In a third variation as shown in FIG. 5, the oven 100 includes a first and second camera having different FOVs (e.g., arranged along different sides of the oven 100 and directed in opposing directions) directed at the food pan. In this variation, a virtual 3D model can be constructed from the images recorded by the first and second cameras. However, the oven 100 can include any other suitable camera.

In a second embodiment, the optical sensor 710 can include one or more photodiodes. The photodiodes can be used to determine the temperature of the foodstuff 10, determine the ambient light (e.g., be an ambient light sensor 770), determine the temperature of the cavity or cavity sub-volume, determine the cooking cavity light intensity, or measure any other suitable light parameter. In one variation, the photodiode measurement can be used to calibrate and/or control the heating element and/or convection elements 400. In a second variation, the photodiode measurement can be used to calibrate the image recorded by the camera. In a third variation, the photodiode can be used to dynamically adjust the touchscreen 831 backlight. In a fourth variation, the photodiode measurements can be used to dynamically adjust the internal cavity light (e.g., by the processor) based on the ambient light to account for ambient light leaking into the cooking cavity 200 (e.g., to cooperatively meet a target cooking cavity light intensity, etc.). In a fifth variation, the photodiode measurements can be used to dynamically adjust the internal cavity light (e.g., by the processor) based on the ambient light to minimize a difference between the internal cavity light and ambient light. However, the photodiode measurements can be otherwise used. The oven 100 can include one or more photodiodes. The photodiode is preferably mounted to the oven 100 exterior (e.g., the oven door 210, oven sides 270, oven top 230, etc.), but can alternatively or additionally be mounted to the oven 100 interior or to any other suitable portion of the oven 100.

In a second variation, the sensor 700 can include a 3D scanner that functions to scan the cooking cavity 200. The 3D scanner is preferably a non-contact scanner, but can alternatively be any other suitable scanner. Examples of 3D scanners include time-of-flight scanners, triangulation scanners, conoscopic holography, optical rangefinding, radar, sonar, or any other suitable scanner capable of collecting data on the shape and contours of the material within the cooking cavity 200.

In a third variation, the sensor 700 can include one or more force sensors 750 (e.g., weight sensors). The force sensors 750 can function to measure the weight of the foodstuff 10 before, during, and after the cooking session. The force sensor measurements can additionally be used to determine the foodstuff weight change throughout the cooking session, which can be used to determine the cooking stage of the foodstuff 10. The force sensors 750 can be arranged in the tray supports (e.g., grooves supporting the food tray), rack supports (e.g., grooves supporting the food rack), in the rack or tray itself, in the oven feet 251 (e.g., the oven 100 standoff from the support surface, mounted to the oven base 250 along a surface opposing the cooking cavity 200, etc.), between the oven feet 251 and the oven base 250, along the oven top 230, or in any other suitable location. In a specific example, the oven 100 includes a single weight sensor arranged in a single foot. In a second specific example, the oven 100 includes a weight sensor arranged in each foot (e.g., wherein the oven 100 can include four feet). In the second specific example, the oven 100 can additionally automatically determine the foodstuff mass distribution within the cooking cavity 200 based on the measured weight distribution across the feet.

In a fourth variation, the sensor can include one or more acoustic sensors that records sounds within the cavity. More preferably, the sensor records sounds of the food cooking. The sound record can be analyzed (at the oven 100 or remotely) to categorize the foodstuff 10, determine the cooking stage, or determine any other suitable foodstuff parameter. The sound sensor can be a microphone, transducer, ultrasound receiver, or be any other suitable sensor. The sound sensor can additionally include an emitter (e.g., speaker) configured to emit sounds of a predetermined frequency (e.g., ultrasound, alerts, etc.) and amplitude. In one variation, a first sound sensor can be arranged next to the convection elements 400 and a second sound sensor can be arranged distal the convection elements 400, wherein measurements from the first sound sensor can be used to cancel fan noise from the measurements of the second sound sensor. In a second variation, the system can include an external speaker voice commands, internal speaker→foodstuff cooking parameter (sizzle, pop)

However, the sound sensor can be otherwise arranged and/or used.

1.9 Emitters.

The oven 100 can include one or more emitters 730 that functions to emit signals that the sensors can measure. For example, the emitter 730 can be a light emitter 731, wherein the camera records optical or visual images using light or other electromagnetic radiation emitted by the light emitter. In a second example, the emitter can be an acoustic emitter, wherein the acoustic sensor records acoustic images using acoustic waves emitted by the acoustic emitter. However, the emitter can emit any other suitable signal. The oven 100 can include one or more emitters of same or different type. Multiple emitters can be individually indexed and individually controlled, controlled together, or otherwise controlled by the processing system 500. Multiple emitters can be arranged in an array or in any other suitable configuration. Multiple emitters can be substantially evenly distributed within the cavity (e.g., along a cavity axis, about the optical sensor 710, etc.), or be unevenly distributed. The emitter(s) are preferably mounted to the cooking lumen (e.g., interior walls), but can alternatively be mounted to the oven 100 exterior, to an exterior arm aimed at the cooking cavity 200, or be otherwise arranged.

In one variation, the emitter includes a light emitter. The light emitter of the oven 100 functions to illuminate the cooking cavity 200, wherein the optical sensor 710 (e.g., image sensor) records light reflected off content within the cooking cavity 200 (e.g., foodstuff 10). The emitter (e.g., light emitting element) can be directed at the same volume as the sensor (camera), be directed at a different volume, or be arranged in any other suitable manner. The emitter is preferably mounted to the same wall as the optical sensor 710 (e.g., to the oven top 230), but can alternatively be mounted to a different wall (e.g., an adjacent wall, etc.) or to any other suitable surface. The emitter is preferably flush with the cavity wall, but can alternatively be recessed or protrude from the cavity wall.

The emitter can emit light having constant color temperature, saturation, color, or any other suitable parameter, or be substantially adjustable (e.g., by the processor, etc.). The light can be selected to maximize the aesthetics of the cooking foodstuff. The emitter can emit white light (e.g., cool white light, warm white light, etc.), light in the visible spectrum, IR light, UV light, or light having any other suitable wavelength. The emitted light intensity can be adjusted based on the ambient light (e.g., increased when the total cavity light falls below a threshold intensity, such as below 10 W/m2, 5 candelas, etc.), based on the foodstuff 10 (e.g., increased for dark foods, decreased for light-colored foods), based on any other suitable parameter, or be substantially fixed. In one example, the oven 100 includes a first and second light emitting element arranged on a first and second side of the camera, respectively, wherein the first and second light emitting elements are equidistant from the camera. Examples of the emitter include an LED, OLED, incandescent lightbulb, or any other suitable electromagnetic radiation emitter.

1.10 User Interface Unit.

As shown in FIG. 1, the oven 100 can additionally include a user interface unit Boo (control unit) that functions to receive input from a user. The user interface unit Boo can additionally function to present information to a user. The user interface unit Boo can include a display 810 and a user input 830. The user interface unit can additionally include a second user input, the processing system 500, computer memory, the communication system 600, or any other suitable component. The user interface unit can be electrically connected to the processor (e.g., through a wire running through the door frame), wirelessly connected to the processor (e.g., through BLE, NFC, RF, or any other suitable wireless connection), or otherwise connected to the processor.

The user interface unit Boo is preferably a single unit, and is preferably substantially collocated (e.g., with components overlaying one another; with each component mounted to one or more of the remainder of the interface unit components, etc.), but can alternatively be distributed over the oven body. All or part of the user interface unit components can be substantially planar, and define a broad face and/or a normal vector (e.g., to the broad face). However, the user interface unit components can be otherwise configured. All or part of the user interface unit can be mounted to the door, more preferably the outer panel 214 but alternatively the inner panel 212, but can alternatively or additionally be mounted to the oven top 230, base 250, sides 270, or any other suitable portion of the oven 100. All or part of the user interface unit Boo is preferably mounted to the transparent window of the door 210, but can alternatively be mounted to the door bezel, door handle, or to any other suitable portion of the oven. All or part of the user interface unit can be coextensive with the transparent window, occupy a segment of the door, or have any other suitable dimension. All or part of the user interface unit can be smaller than the transparent window, and be arranged such that the door regions adjacent (e.g., contiguous) the user interface unit (e.g., along one, two, three, or all user interface unit edges) are transparent. In one example, the user interface unit can be arranged along the transparent window, offset from the door bezel (e.g., door edge, panel edge) or inner panel coupling region. However, the user interface unit can abut the door bezel or be otherwise arranged. All or part of the user interface unit is preferably mounted with the broad face parallel the door and the normal vector or projection intersecting the cooking cavity 200, but can alternatively be mounted offset from the cooking cavity 200 or mounted in any other suitable orientation.

The display 810 of the user interface unit Boo functions to present information to a user. The display 810 can be the oven door 210, a portion of the oven door 210, be a separate component integrated into the door (e.g., be flush with the door exterior and/or interior; extend outward of the door exterior and/or interior), be a separate and discrete component from the oven door 210, or be otherwise arranged. When the display 810 is a separate component integrated into the door, the display 810 can be mounted to a recess (e.g., thinned portion) defined in the door, mounted to the door surface (e.g., to a full-thickness portion of the door), mounted to a cutout in the door (e.g., wherein the display 810 is mounted within the cavity defined by the cutout), or otherwise mounted to the door. In one variation, the display 810 can occupy the entirety of the door. In a second variation, the display 810 can occupy a segment of the door. In an embodiment of the second variation, the display 810 is mounted to the transparent window of the door.

The display 810 is preferably arranged along (e.g., mounted to) the outer door wall, such that the airgap between the inner and outer door walls function to thermally insulate the display 810 from the cavity interior, but can alternatively be arranged along the inner door wall, arranged along a side or the top of the oven 100, or arranged in any other suitable location. The display 810 can be transparent, opaque, translucent, or have any suitable optical parameter. In one variation, the display 810 can be opaque, but include a camera along the side of the display 810 proximal the cavity that streams of the cooking food behind the display 810 to be displayed on the display 810. The display 810 can be a liquid crystal display (LCD), a thin film transistor liquid crystal display (TFT-LCD), light emitting diode display (LED), an organic light emitting diode (OLED) display, a plasma display, a video projector, a combination thereof, plasma display, projection display, or be any other suitable display. The OLED display can be a passive-matrix OLED (PMOLED) or active-matrix OLED (AMOLED) display. However, the user interface unit can include any other suitable display configured in any other suitable manner.

The user input 830 of the user interface unit functions to receive input from the user, which can be communicated to the processor of the oven 100. The user input 830 can be arranged proximal the display 810 (e.g., overlaid over the display 810, arranged next to the display 810, etc.), arranged distal the display 810, or be otherwise arranged. The user input 830 can include a touchscreen 831 overlaid over the display 810, the user device, a keypad (digital or physical), a knob, or any other suitable user input. The touchscreen 831 can be a capacitive touchscreen, such as a surface capacitance, mutual capacitance, projected capacitance, or self capacitance touchscreen; resistive touchscreen; dynamic touchscreen defining pixels; surface acoustic wave touchscreen; infrared grid; acoustic pulse touchscreen; or any other suitable user input capable of recognizing one or more touches. In one variation, the capacitive touchscreen can be formed from the door (e.g., functioning as the touchscreen insulator) and a transparent conductor coupled to the door (e.g., etched into, coating, etc. the interior or exterior surface of the door or outer panel 214). In a second variation, the capacitive touchscreen can include an insulator coated with a conductor, wherein the capacitive touchscreen is integrated into the door. However, the touchscreen 831 can be otherwise configured.

The user interface unit can additionally include a second user input. The second user input can function to change the operation mode of the first user input, function to enable a rougher degree of control over the user interface, or enable any other suitable functionality. The second user input can be a rotary knob 833 (e.g., click knob), scroll wheel, touchscreen, or be any other suitable user input. The rotary knob 833 can be magnetically indexed to a plurality of angular positions, actuate about a rotational axis, actuate along the rotational axis (e.g., be depressable), or be otherwise actuatable. In one example, knob rotation can move through a set of lists, while touchscreen interaction (e.g., swiping) can move through a set of content within a given list. Knob depression or touchscreen tapping can select an item within a list. However, any other suitable user input interaction can interact with the user interface. The second user input is preferably mounted proximal the first user input, but can alternatively be mounted distal the first user input. The second user input can be mounted to the oven door 210, oven body, or any other suitable mounting point. The second user input can be mounted with a major axis (e.g., rotary axis, normal axis, etc.) or projection intersecting the cooking cavity 200, offset from the cooking cavity 200, or otherwise arranged.

1.11 Auxiliary Components.

The oven 100 can additionally include auxiliary component interfaces, which function to expand the functionality of the oven 100. For example, the oven 100 can include an electrical connector 101 (e.g., temperature probe jack for an insertion temperature probe) that functions to electrically connect to (e.g., receive data from and/or supply power to) a temperature probe. In a second variation, the oven 100 can include a USB connector for an auxiliary weight scale, food scanner, or other connected kitchen device (e.g., sous vide system). However, the oven 100 can include any other suitable interface and utilize the information in any other suitable manner. The auxiliary component interfaces are preferably mounted to the cooking lumen (e.g., oven body interior), but can alternatively or additionally be mounted to the oven 100 exterior. The auxiliary component interfaces are preferably connected to the processor (e.g., through a wired or wireless connection), but can alternatively be connected to any other suitable component.

The oven 100 can additionally include a wall standoff 291 (bumper), as shown in FIG. 2, that functions to maintain a minimum distance between the oven 100 and a vertical member (e.g., wall). The oven 100 can include one or more wall standoffs. The wall standoff preferably includes at least two points extending equidistant from an oven surface, but can alternatively extend different distances from the oven surface. The two points are preferably substantially symmetric about an oven axis (e.g., the vertical or longitudinal axis), but can alternatively be asymmetric or otherwise arranged. The two points can be substantially horizontally aligned, offset, or otherwise arranged. In one variation, the wall standoff is a singular linear piece, aligned along the center of the bottom edge of the oven back wall 290 (external wall). In a second variation, the wall standoff includes a first and second horizontal linear piece arranged along a first and second side of the bottom edge of the oven back wall 290. However, the wall standoff can be angled, vertical, or otherwise oriented.

The oven 100 can additionally include a fluid injector that functions to selectively inject a predetermined volume of fluid into the cooking cavity 200. The fluid injector can include a fluid reservoir, a fluid manifold fluidly connecting the reservoir to the cooking cavity 200, and a valve system controlling fluid flow between the reservoir and cooking cavity 200. The fluid injector can additionally include a heating element that functions to heat fluid from the reservoir prior to fluid injection into the cooking cavity 200 (e.g., to a predetermined temperature). Alternatively, the fluid can be heated by waste heat from the cooking cavity 200, remain unheated, be cooled, or be otherwise treated. The fluid injector can additionally include a nozzle (e.g., static or actuatable) that functions to direct fluid introduction into the cooking cavity 200. Examples of the fluid injector include a steam injector, flavor injector (e.g., smoke injector, etc.), or any other suitable injector.

The oven 100 can additionally include a catalytic converter that functions to remove odors from the oven exhaust. The catalytic converter is preferably arranged in-line (e.g., serially) with the oven 100 exhaust, but can alternatively be arranged within the cooking cavity 200 or along any other suitable portion of the oven 100. The oven 100 can additionally include a cooling system (e.g., Peltier cooler, water cooling system, heat pump, etc.), or include any other suitable component.

The oven 100 can additionally include a power cable that functions to supply power from a power grid or wall outlet to the oven 100. The power cable can additionally communicate data or perform any other suitable functionality. The power cable can extend from the bottom of the oven 100, from the back of the oven 100, from the side of the oven 100, or from any other suitable portion of the oven 100. The power cable can be round, flat, or have any other suitable form factor.

The oven 100 can additionally include a food tray (e.g., baking tray, baking pan) that functions to support foodstuff within the cooking cavity. The food tray can additionally function to provide a substantially consistent background for food imaging and/or image processing. The food tray can be metal (e.g., aluminum), ceramic, or be made of any other suitable material. The food tray is preferably matte, but can alternatively be reflective. The food tray is preferably black (e.g., on the food-supporting broad face, the opposing broad face, etc.), but can alternatively have any other suitable color. The food tray preferably defines a non-stick surface, which can be an inherent property of the food tray material, created by a coating, or otherwise obtained. The coating can include Teflon™, ceramic, or any other suitable material. In a specific example, the tray is made of solid aluminum with a non-stick coating. The aluminum can minimize warping under heat gradients (e.g., due to the rapid heat distribution properties), and the non-stick coating can additionally prevent the aluminum from reacting with acids.

2. Applications/Smart Cooking Method.

The method for connected oven operation can include: recording a set of oven measurements at the oven S100, determining a set of foodstuff features based on the oven measurements S200, determining cooking instructions based on the foodstuff features S300, and dynamically controlling oven operation based on the cooking instructions S400. The method can be performed by the system disclosed above (e.g., the oven, the processor of the oven, etc.), or be performed with any other suitable system. All or a portion of the method can be performed by the remote computing system, oven (e.g., as disclosed above, alternatively a different oven), user device, and/or any other suitable computing system. All or a portion of the method can be performed in real- or near-real time, after a delay, concurrently, asynchronously, or with any other suitable temporal relationship. All or a portion of the method can be performed automatically, pseudo-manually (e.g., in response to receipt of a user input), or at any other suitable time. All or a portion of the method can be repeated, performed periodically, or performed at any other suitable frequency. Multiple method instances for different ovens, foodstuffs, or users can be performed in parallel, in series, or with any other suitable temporal relationship. However, the method can be otherwise performed.

The method can function to automatically adjust oven operation during a cooking session to achieve a target food parameter (e.g., a target crispness, etc.) with little or no manual input. Furthermore, because oven operation is automatically controlled, different operation parameters, such as temperature gradients and airflow, can be varied and/or more precisely controlled over the course of the cooking session. For example, instead of baking prime rib at a substantially constant low temperature, the oven enables the prime rib to be cycled through high and low temperatures throughout its cooking period. In another example, the oven can dynamically determine that there is more foodstuff mass to the right of the cavity than the left (e.g., based on the weight sensors), and increase heat output from the right heating elements relative to the left heating elements. The method can additionally function to automatically identify the foodstuff within the cavity based on the sensor measurements (e.g., image, weight, temperature, etc.), and automatically suggest cooking instructions for, or automatically cook the foodstuff, based on the foodstuff identity. The method can additionally function to stream images of the foodstuff (e.g., of foodstuff cooking in-situ) to the user device or other endpoint during the cooking process. The method can additionally function to continually monitor all instances of foodstuff cooking in-situ, for one or more ovens. The method can additionally function to generate a set of supervised training data through typical oven use, which can be used to train modules to automatically identify foodstuff. The method can additionally function to automatically generate recipes through the act of cooking (e.g., via user remote control), or perform any other suitable functionality.

The method can be performed in association with a set of target parameters for the foodstuff. The target parameters can be target foodstuff parameters, oven operation parameters, or any other suitable parameter. The target parameters can be for a given stage in the cooking process (e.g., minutes after foodstuff introduction into the cavity), a target endpoint parameter (e.g., target cooking parameter value when the food is "done," removed from the oven, and/or ready for consumption), or be any other suitable target parameter. Examples of target parameters include the amount of bread browning, amount of skin or surface crispness, water content of the foodstuff, water ratio of the foodstuff, denatured protein uniformity throughout the foodstuff, volume of a predetermined sound frequency (e.g., corresponding to a cooking stage), duration that a predetermined sound frequency has been substantially maintained, a weight loss ratio, and a threshold concentration of a given volatile or aromatic compound being released (e.g., 5 g/L, mol/L, etc.). However, the target parameter can be any other suitable target parameter.

The target parameters can be preferences of a user (e.g., received from the user or determined from a history of user oven use), wherein the user can be a primary user, user proximal the oven during the foodstuff insertion event (e.g., connected to the oven via a short-range communications channel, determined from a user image, etc.), or any other user; preferences of a user population (e.g., average parameter value, etc.); specified by an entity (e.g., a chef); recommended parameters (e.g., from food safety agencies, etc.); or be determined in any other suitable manner. The target parameters can be received from a user (e.g., at the oven, at a user device), retrieved based on a foodstuff identifier (e.g., bar code, etc.), read from the foodstuff identifier (e.g., QR code, etc.), dynamically determined by the oven or remote computing system (e.g., based on the foodstuff parameters, such as foodstuff type, weight, starting temperature, ambient humidity, etc.), specified in a recipe, or otherwise determined.

The recipes can be stored in a database, wherein the database can be stored by the remote system, oven, user device, or any other suitable computing system. Each recipe can specify a temperature schedule for the cavity or foodstuff, an airflow schedule (e.g., mass flow, velocity, etc.), the amount of power to apply to the heating element and/or convection element at any given time, or specify any other suitable parameter value for a cooking session. The stored recipes and/or target parameters can be changed or updated based on: new user input, new demographic preferences, new identified users, or based on any other suitable data. In one example, the user can select a new target foodstuff parameter (e.g., "browner") for the foodstuff currently cooking in-situ, the system can automatically determine a set of target oven operation parameters to achieve the target foodstuff parameter (e.g., increase power the top heating elements, increase fan speed), and the oven can be automatically controlled to meet the set of target oven operation parameters. The set of target oven operation parameters can be determined based on the cooking history for the in-situ foodstuff, based on a cooking response profile for the foodstuff (e.g., determined from the cooking history and/or response for similar foodstuff from other ovens), or otherwise determined.

The method can additionally be used with a set of identification modules that function to automatically identify the foodstuff in-situ. The identification module can classify the foodstuff (e.g., function as a classification module), determine a value for each of a set of foodstuff parameters, such as crispness or doneness (e.g., function as a regression module), extract foodstuff parameters from the sensor measurements for subsequent analysis, or perform any other suitable functionality. Each module of the set can utilize one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Examples of reinforcement learning include using a brute force approach, value function approach (e.g., Monte Carlo method, temporal difference method), direct policy approach, or otherwise reinforced. Examples of supervised learning include using: analytical learning, artificial neural network, backpropagation, boosting (meta-algorithm), Bayesian statistics, case-based reasoning, decision tree learning, inductive logic programming, Gaussian process regression, group method of data handling, kernel estimators, learning automata, minimum message length (decision trees, decision graphs, etc.), multilinear subspace learning, Naive Bayes classifier, nearest neighbor algorithm, probably approximately correct learning (pac) learning, ripple down rules, a knowledge acquisition methodology, symbolic machine learning algorithms, subsymbolic machine learning algorithms, support vector machines, minimum complexity machines (mcm), random forests, ensembles of classifiers, ordinal classification, data pre-processing, handling imbalanced datasets, statistical relational learning, or otherwise learned. Examples of unsupervised learning include using a method of moments approach or otherwise learned.

Each module of the set can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution neural network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each module of the set can additionally or alternatively be a: probabilistic module, heuristic module, deterministic module, or be any other suitable module leveraging any other suitable computation method, machine learning method, or combination thereof.

All or a subset of the modules can be validated, verified, reinforced, calibrated, or otherwise updated based on newly received, up-to-date measurements of the cooking session; past foodstuff measurements recorded during cooking sessions; historic foodstuff measurements recorded during past cooking sessions, or be updated based on any other suitable data. All or a subset of the modules can be run or updated: once; every year; every time the method is performed; every time an unanticipated measurement value is received; or at any other suitable frequency. All or a subset of the modules can be run or updated concurrently, serially, at varying frequencies, or at any other suitable time. All or a subset of the modules can be validated, verified, reinforced, calibrated, or otherwise updated based on newly received, up-to-date data; past data or be updated based on any other suitable data. All or a subset of the modules can be run or updated: in response to receipt of a new foodstuff classification by a user (e.g., new user confirmation), in response to determination of a discrepancy between the module output(s) and the actual foodstuff class, or at any other suitable frequency.

2.1 Recording Oven Measurements.

Recording the set of oven measurements S100 functions to generate a set of raw data. The raw data can be used to: classify foodstuff, monitor foodstuff cooking status, generate training sets (e.g., supervised or unsupervised), or perform any other suitable downstream process. The set of oven measurements can be recorded by the sensors of the oven, by a user device associated with the oven (e.g., a mobile device electrically connected or wirelessly connected to the oven), by an auxiliary device (e.g., a temperature probe), by a secondary connected device (e.g., a connected weight, a connected refrigerator, a connected sous vide machine, etc.), or be measured by any other suitable component. The sensors used to record the measurements can be preferably non-contact sensors, contact sensors (e.g., probes), or any other suitable sensor.

Oven measurements (sensor measurements) can be measured for a single timestamp, or across a time period. Oven measurements can be recorded at a predetermined frequency (e.g., during the cooking session), in response to the occurrence of a recording event (e.g., in response to occurrence of a food insertion event, in response to receipt of a query from a user device, in response to expiration of a cooking timer, etc.), or be recorded at any other suitable time.

Oven measurements can include foodstuff measurements, oven measurements, user measurements, or any other suitable set of measurements. Oven measurements can include values, patterns over time, associations between a first and second sensor measurement (e.g., a ratio, etc.), or any other suitable characterization. Examples of foodstuff measurements include color images (e.g., stream, such as a video, or single images), thermal images, surface temperature (estimated or actual), internal temperature (estimated or actual), audio, humidity (e.g., internal or external), weight, weight distribution, volatile molecule composition, or any other suitable food parameter. Examples of oven measurements or oven parameters include: target temperatures, cavity temperatures (e.g., average, at given point in the cavity, gradients across the cavity, etc.), airflow (volume, rate, direction, etc.), applied light, electromagnetic emission within the cavity, the heating element identifier (e.g., which heating element is being controlled), the fan identifier (e.g., which fan is being controlled), the sensor identifier, or any other suitable parameter of oven operation.

The oven measurements can be used by the oven itself, sent to the remote system, sent to the user device, or otherwise managed. The oven measurements can be sent to the remote system by the oven, by a user device associated with the oven (e.g., a mobile device electrically connected or wirelessly connected to the oven), by an auxiliary device (e.g., a temperature probe), by a secondary connected device (e.g., a connected weight, a connected refrigerator, a connected sous vide machine, etc.), or be sent by any other suitable component. However, the oven measurements can be otherwise sent to the remote system.

The method can additionally include illuminating the cooking cavity (e.g., with the set of light emitting elements), which functions to illuminate the cooking cavity and foodstuff for subsequent in-person viewing, image capture (e.g., streaming, food identification, etc.), and other visual applications. The cooking cavity can be illuminated in response to detection of the foodstuff insertion event, during the cooking session (e.g., continuously or periodically), in response to the user turning on the light, or at any other suitable time. In one variation, illuminating the cooking cavity includes operating the light emitting elements to meet a predetermined set of illumination parameters (e.g., intensity, color, etc.).

In a second variation, illuminating the cooking cavity includes operating the light emitting elements to meet a target set of illumination parameters. This embodiment can function to accommodate for ambient light leaking through transparent portions of the oven. In one embodiment, light emitting element operation is incrementally adjusted until a target illumination parameter is met (e.g., as determined by a light sensor within the cavity, by the camera, etc.). In a second embodiment, parameters of the ambient light are determined (e.g., by the oven processor, based on the ambient light sensor), illumination parameters for the light emitting elements are determined based on the ambient light parameters (e.g., cooperatively achieve a set of target illumination parameters with the ambient light), and the light emitting elements are controlled to meet the illumination parameters. However, the cavity can be otherwise illuminated. The target set of illumination parameters can be predetermined, selected for streaming, for image analysis, for in-person viewing (e.g., to minimize blinding a user at night), or otherwise selected. In a specific example, the light emitting elements can be operated to meet a first set of target illumination parameters to capture an initial image for foodstuff identification, and subsequently operated to meet a second set of target illumination parameters tailored toward streaming video of the food in-situ. However, the cooking cavity and/or foodstuff can be otherwise illuminated.

In one example, the oven can additionally stream a video of the oven cavity and/or cooking food products to the remote system. In a second example, the oven can record and/or send sensor measurements to the remote system: periodically, in response to the occurrence of a trigger event (e.g., food insertion event, send event, etc.), or at any other suitable time. Measurements from different sensors can be concurrently recorded or asynchronously recorded (e.g., within a predetermined time duration, separated by a predetermined time duration, etc.), or otherwise recorded. However, the oven measurements can be otherwise recorded.

2.2 Determining Foodstuff Features.

Determining foodstuff features based on the oven measurements s S200 functions to determine a characterization of the foodstuff within the cavity. The foodstuff features can be used to identify the foodstuff, monitor foodstuff cooking progress, or be used in any other suitable manner. The foodstuff features are preferably determined by the oven, but can alternatively be entirely or partially determined by the remote computing system. Foodstuff features can include: image features (e.g., foodstuff features extracted from an image of the foodstuff), weight, temperature (internal, external, etc.), humidity, density, or any other suitable feature. The foodstuff features can be extracted from the oven measurements (e.g., from the foodstuff image), be the oven measurements itself, or be otherwise determined.

Foodstuff features can be determined in response to occurrence (e.g., detection) of a foodstuff insertion event. The foodstuff insertion event can be: an oven door opening event (e.g., the door latch unlatching), an oven door closing event, an oven weight increase, recordation of an inertial measurement pattern indicative of door opening, a combination of the above, or recordation any other suitable set of measurements. Foodstuff features can additionally or alternatively be determined while the foodstuff is being cooked by the oven. For example, the foodstuff features can be determined: periodically, in response to occurrence of a predetermined event, in response to recordation of a predetermined set of oven measurements.

In a first variation, the foodstuff features include foodstuff weight. In a first embodiment, the foodstuff weight can be determined from the load sensors (e.g., weight sensors) of the oven. This can include: recording load measurements from one or more load sensors, determining a change in the load measurement values, and determining the foodstuff weight as the difference. In a second embodiment, the foodstuff weight can be received from a user device. In a third embodiment, the foodstuff weight can be received from a connected scale. However, the foodstuff weight can be otherwise determined.

In a second variation, the foodstuff features include weight distribution. In a first embodiment, determining foodstuff weight distribution includes comparing the load measurements from a first, second, third, and fourth load sensor arranged along a first, second, third, and fourth corner of the oven, and locating the foodstuff mass within the cooking cavity based on the differences between the load measurements. However, the foodstuff distribution can be otherwise determined.

In a third variation, the foodstuff features can be extracted from an image of the foodstuff. Foodstuff features that can be extracted from the image include: foodstuff shape, size (e.g., physical size), color (e.g., average color, color gradients, etc.), contour, texture, number (e.g., count), spatial distribution (e.g., foodstuff mass to the right or left of the cooking cavity), or any other suitable feature that can be visually determined. Foodstuff can additionally be recognized from the image, using convolutional neural network methods, appearance-based methods (e.g., edge matching, divide-and-conquer searching, grayscale matching, gradient matching, histograms, large modelbases, etc.), feature-based methods (e.g., interpretation trees, hypothesizing, pose consistency, pose clustering, invariance, geometric hashing, scale-invariant feature transform, speeded up robust features, etc.), generic algorithms, or using any other suitable method. In one variation, foodstuff features are determined from the image using: per-pixel classification, pixel grouping and/or clustering (e.g., to identify like pixels), and/or cluster classification (e.g., to determine whether a group of pixels is representative of a rack, tray, foodstuff, etc.). However, the foodstuff features can be otherwise determined.

The image can be the raw image recorded by the camera or be pre-processed. Pre-processing the image can include: dewarping the image (e.g., dewarping a distorted image, such as a fisheye image), mosaicing multiple images together, resizing the image, filtering the image, removing images of the ambient environment captured in the image (e.g., cropping the image, transforming the image using a transfer function, etc.), or otherwise pre-processing the image. In a specific example, processing the raw image can include: identifying a set of input pixels, mapping each input pixel (e.g., of an input set) to an output pixel (e.g., of an output set) based on a map, and interpolating the pixels between the resultant output pixels to generate an output frame. The input pixels can optionally be transformed (e.g., filtered, etc.) before or after mapping to the output pixel. The map can be determined based on processing instructions (e.g., predetermined, dynamically determined), or otherwise determined. The input pixels can be a subset of the image frame (e.g., a segment of the frame, wherein the input pixels are contiguous; a sampling of the frame, wherein the input pixels are separated by one or more intervening pixels), be the entirety of the image frame, or be any other suitable portion of the frame. One or more input pixel sets can be identified from the same frame, and processed into different output views (e.g., a "birdseye view" of the cooking cavity, a "zoomed in" view of the foodstuff on the right, a "zoomed in" view of the foodstuff on the left, etc.); alternatively, a single input pixel set can be identified from any given frame. The image can be pre-processed by the oven (e.g., by multi-purpose processing units, dedicated processing units, etc.), by the remote computing system, by the user device, or by any other suitable computing system.

In one variation, extracting foodstuff features from the image S210 can include: segmenting the image into a foreground and a background S211, and extracting foodstuff features from the foreground S213. In some embodiments, image segmentation into the foreground and background can be streamlined by providing a known, constant-color background (e.g., black, white, etc.). The background can be the baking tray, cooking cavity interior, or any other suitable portion of the oven opposing the camera. The background can additionally be matte (e.g., low-reflectance) to facilitate rapid segmentation. In one embodiment, the foreground can include the foodstuff, the tray, and the oven rack. In a second embodiment, the foreground can include the foodstuff and the oven rack (e.g., wherein the tray and background are the same color). In a third embodiment, the foreground can include the foodstuff only. However, the foreground can be otherwise defined. The image can be segmented using: thresholding, clustering methods, compression-based methods, histogram-based methods, edge detection, dual clustering method, region-growing methods, partial differential equation-based methods (e.g., parametric methods, level set methods, fast marching methods, variational methods, graph partitioning methods (e.g., Markov random fields; supervised image segmentation using MRF and MAP; optimization algorithms, such as iterated conditional modes/gradient descent, simulated annealing, etc; unsupervised image segmentation using MRF and expectation maximization, etc.), watershed transformation, model based segmentation, multi-scale segmentation (e.g., one-dimensional hierarchical signal segmentation, image segmentation and primal sketch), semi-automatic segmentation, trainable segmentation, or any other suitable segmentation method.

In one embodiment, extracting foodstuff features from the foreground includes determining a physical foodstuff shape (e.g., foodstuff boundary). This can include identifying a continuous region indicative of foodstuff (e.g., contiguous region indicative of foodstuff) within the foreground and determining the perimeter of the contiguous region (e.g., using edge detection techniques, gradient descent techniques, etc.).

In a second embodiment, extracting foodstuff features from the foreground includes determining a physical foodstuff area (e.g., foodstuff projection). This can include: identifying a contiguous region indicative of foodstuff within the foreground, and determining the foodstuff area based on the amount of the image occupied by the contiguous region. However, the foodstuff area can be otherwise determined from the foreground. In a first example, the foodstuff area can be determined based on the estimated physical area captured within the image and the percentage of the image occupied by the identified region. In a second example, the foodstuff area can be determined based on the number of contiguous pixels within the identified region and a pixel-to-physical area map. The foodstuff area can be the number of pixels within the region multiplied by the pixel-to-physical area ratio, or be otherwise determined.

In a third embodiment, extracting foodstuff features from the foreground includes determining a physical foodstuff height. Determining the foodstuff height can include determining the foodstuff top distance from the oven top (e.g., determining foodstuff proximity to the oven top or camera), or determining any other suitable foodstuff parameter along the z-axis. The foodstuff height can be determined based on the rack level used (e.g., based on load sensors within the rack support, based on adjacent wire distance within the image, based on total tray-to-wall gap, etc.), the foodstuff contour, or based on any other suitable parameter.

In a first example, the foodstuff height can be determined based on the foodstuff classification (e.g., wherein the food class is typically flat, round, etc.). In a second example, the foodstuff height is determined based on the foodstuff contour. The foodstuff contour can be determined using a scanner (e.g., 3D scanner), using a plurality of images recorded under different conditions, or otherwise determined. In a first specific example, the contour can be determined from a first and second image recorded from a first and second visual angle (e.g., from a stereoscopic camera, from a single camera that has been moved, etc.). In a second specific example, the contour can be determined from a first and second image using different illumination angles, wherein the contour can be determined based on shadow analysis. For example, a first and second light emitting element, arranged along a first and second side of a camera, can be selectively turned on and off, wherein the camera captures the first image when first light emitting element is on and second is off, and captures second image when first light emitting element is off and second is on. However, the contour can be otherwise determined.

Extracting the foodstuff features from the image S210 can optionally include determining a pixel-to-physical area map for the image S215. This can function to accommodate for perspective differences due to foodstuff arrangement on different rack levels. This can be performed prior to foodstuff feature determination from the image, or be performed at any other suitable time. Different pixel-to-physical area maps are preferably associated with different rack levels, but different rack levels can alternatively share a pixel-to-physical area map. The pixel-to-physical area maps for each rack level is preferably predetermined, but can alternatively be dynamically determined or otherwise determined.

In a first variation, determining the pixel-to-physical area map can include identifying the rack level being used. In one example, the rack level used can be determined based on load cells arranged within the rack supports.

In a second variation, the pixel-to-physical area map can be determined based on the rack image, wherein the rack has a known distance between adjacent wires (e.g., wherein the adjacent wires appear further apart when the rack is on the top level, and appear closer together when the rack is on the lower level, such that the apparent adjacent wire distance functions as a reference). This variation can include: identifying adjacent wires of an oven rack within the image; determining a pixel distance between the adjacent wires within the foreground; and determining pixel-to-physical area mapping based on the pixel distance (e.g., selecting the map associated with the determined pixel distance).

In a third variation, the pixel-to-physical area map can be determined based on the gap between the oven wall and baking tray edges, wherein the baking tray has known dimensions (e.g., wherein the gap can function as a reference). This variation can include: identifying the baking tray perimeter within the image; determining a total pixel distance between the baking tray edges and the oven walls; and determining pixel-to-physical area mapping based on the total pixel distance (e.g., selecting the map associated with the determined pixel distance).

In a fourth variation, the pixel-to-physical area map can be determined based on the number of rack supports (e.g., tracks, levels, etc.) visible within the image. For example, a first pixel-to-physical area map associated with a lowermost rack position can be selected if portions of two rack supports are visible within the image; a second pixel-to-physical area map associated with a middle rack position can be selected if portion one rack support is visible within the image; and a third pixel-to-physical area map associated with an uppermost rack position can be selected if no rack supports are visible within the image. However, the pixel-to-physical area map can be otherwise determined.

In a fifth variation, the pixel-to-physical area map can be determined based on the rack position specified by a user (e.g., wherein a user selects the rack position). In one embodiment of this variation, the method can additionally include: in response to food insertion into the cavity and initial foodstuff image recordation; estimating a rack position based on the initial foodstuff image; presenting an identifier for the estimated rack position to the user; in response to user confirmation of the estimated rack position, using the pixel-to-physical area map associated with the estimated rack position; and in response to user selection of a different rack position, using the pixel-to-physical area map associated with the user-selected rack position. The estimated rack position, initial foodstuff image, and/or user selection (or confirmation) can additionally be used to train a rack position determination module (e.g., using machine learning techniques) by the oven, remote computing system, user device, or other system. In a second embodiment, the method can include suggesting a rack level (rack position) based on the identified foodstuff (e.g., based on an associated recipe, etc.). This embodiment can optionally include tracking whether a user takes subsequent action (e.g., opens the door, lifts the tray off the rack level, re-inserts the tray, etc.), wherein the subsequent user action can be used to train the rack position determination module.

However, the pixel-to-physical area map can be determined in any other suitable manner. However, the foodstuff size can be otherwise determined.

Determining foodstuff features can additionally include identifying the foodstuff within the cooking cavity S230, which can subsequently be used to determine the cooking instructions. The foodstuff can be identified in response to foodstuff insertion into the oven, in response to receipt of a user input, or at any other suitable time. The foodstuff is preferably identified once per cooking session, but can alternatively be identified any suitable number of times per cooking session. The foodstuff is preferably identified by the oven, but can alternatively be identified by the remote computing system, user device, user, or any other suitable system. The foodstuff can be identified based on foodstuff parameters, such as weight, temperature, shape, color, variations of the aforementioned parameters over space, variations of the aforementioned parameters over time (e.g., velocity of change, acceleration of change, etc.), or based on any other suitable foodstuff parameters. Additionally or alternatively, the foodstuff can be identified based on an identifier, such as a color, a QR code, a barcode, a user selection, or any other suitable identifier. The identifier can be extracted from the images recorded by the oven, identified by a code reader on the oven, identified by a code reader on the user device, received from the user interface unit, or identified in any other suitable manner.

In a first variation, the foodstuff is identified based on a foodstuff identifier determined from the foodstuff packaging (e.g., scanned, read, etc.). The foodstuff identifier can be determined from a QR code, barcode, or any other suitable identifier associated with the foodstuff. The foodstuff identifier can be read by the in-chamber camera, by a camera on the oven door, by the user device, by a BLE radio, or by any other suitable system.

In a second variation, the foodstuff is identified (e.g., the foodstuff class determined) based on foodstuff features using an identification module (e.g., a set of classification modules) S231. Foodstuff features used can include image features (e.g., size, shape, color, area, boundaries, saturation, gradients, etc.), weight, temperature, or any other suitable foodstuff feature. The oven, remote computing system, user device, or other computing system can classify the foodstuff, using an identification module stored locally. Copies of the classification system can be stored by the other connected computing systems. The remote computing system is preferably the source of truth (e.g., wherein the classification system stored by the remote computing system has higher priority than other copies), but any other suitable system can function as the source of truth. When the foodstuff is classified by a non-oven system, the non-oven system preferably receives the image, classifies the foodstuff within the image, and sends the classification or information associated with the classification (e.g., a recipe) back to the oven. However, the foodstuff can be otherwise classified.

In one embodiment of the second variation, the system can include a different identification module for each food class, wherein the classification system determines a probability for each of a plurality of food classes. The different identification modules can use different subsets of foodstuff features, or use the same set. In a second embodiment, the system can include a single identification module for all food classes, wherein the classification system outputs a single food class. This identification module can utilize a set of chained modules, each considering a different subset of foodstuff features, that progressively narrow down the possible food classes. However, the identification module can consider any suitable set of food features, and be structured in any other suitable configuration.

The second variation can additionally include receiving a user classification for the foodstuff class S233, which functions to generate a supervised training set for subsequent classification system refinement. Receiving a user classification of the foodstuff class can include: displaying an identifier for the foodstuff class in response to foodstuff identification at a user interface (e.g., of the oven, user device, etc.); and receiving a user input based on the displayed identifier (e.g., at the user interface, at a second user interface, etc.). The foodstuff class identifier can be text (e.g., a name), an image (e.g., a generic image, a historic image from a past cooking session, etc.), or any other suitable identifier. In one embodiment, a single identifier is displayed on the user interface for the foodstuff currently within the cavity. In a second embodiment, a list of identifiers for potential foodstuff classes is displayed on the user interface for the foodstuff currently within the cavity. The foodstuff class identifiers are preferably presented in decreasing probability order, but can alternatively be presented in increasing probability order, randomized, in decreasing popularity order (e.g., for a population or the user), or presented in any other suitable order. Receiving the user classification can include: receiving a user selection of an identifier for a foodstuff class at the user interface (e.g., from the list), receiving a user confirmation or denial of the single presented identifier, receiving a cooking initiation selection from the user, or receiving any other suitable user input.

Receiving user confirmation of the foodstuff class S233 can additionally include sending the user classification and the data associated with the oven measurements to the remote computing system. The data associated with the oven measurements can be the oven measurements from which the food classification was determined, the foodstuff features from which the food classification was determined, or include any other suitable data. The user classification and data can be sent through the user device, sent directly to the remote computing system, or otherwise transmitted from the oven.

Receiving user confirmation of the foodstuff class S233 can additionally include updating the identification module(s). The identification modules can be updated by the oven, by the remote computing system, by the user device, or by any other suitable system. The identification modules can be updated based on the user classification, the data associated with the user classification (e.g., underlying images, sensor measurements, etc.), parameters of the user account associated with the user classification (e.g., classification reliability, demographic, etc.), parameters of the oven from which the user classification was received (e.g., sensor calibration, sensor measurement reliability, etc.), historic user classifications, and/or any other suitable information. The entire identification module can be updated, specific sub-modules can be updated (e.g., the identification module for the foodstuff class), or any suitable set of sub-modules can be updated. The identification modules can be updated for a single oven, for a subset of ovens (e.g., ovens sharing a similar parameter, such as ambient parameters), for all ovens, for a single user, for a subset of users (e.g., users sharing a similar parameter, such as demographic, location), for all users, or for any other suitable subset of the oven or user population.

The identification modules can be updated in response to the user classification differing from the foodstuff parameters identified by the identification modules (e.g., foodstuff class, foodstuff feature value, etc.) beyond a threshold difference, periodically, or be updated at any other suitable frequency. In one example, the identification module is updated in response to the identified class differing from the user classification. In a second example, the identification module is updated in response to the identified feature value differing from the user classification beyond a threshold value difference. However, the identification module can be updated at any other suitable time.

The identification modules can be updated during the cooking session, in response to receipt of the user confirmation (e.g., in near-real time), updated after the cooking session, updated periodically based on multiple user confirmations (e.g., from one or more users), updated in response to a threshold number of user confirmation receipt, or determined at any other suitable time. In one example, different ovens can be concurrently trained on different user classification sets, wherein the resultant identification modules can be subsequently compared (e.g., periodically, in response to a threshold condition being met, etc.) to identify the more accurate and/or precise model. The identified model can subsequently be used as the global classification model (e.g., sent to all ovens), or otherwise used. When the identification module is updated by computing system separate and distinct from the oven, the updated identification module can be sent (e.g., pushed) to the oven, wherein the oven can store and use the updated identification module to identify foodstuff (e.g., recognize foodstuff) for subsequent cooking sessions. The updated identification module can be sent to the oven in near-real time (e.g., upon identification module updating), periodically, at a predetermined time of the day (e.g., 3 am), when the user is absent from the house (e.g., as determined from auxiliary connected systems or otherwise determined), or at any other suitable time.

In one variation, updating the identification module can include: retrieving a copy of the identification module; in response to the user classification substantially matching the foodstuff class identified by the identification module (e.g., the foodstuff class having the highest probability or probabilities), determining a second identification module by reinforcing the copy of the identification module based on the data and the user classification; in response to the selected identifier differing from the foodstuff class identified by the identification module, determining a second identification module by re-training the copy of the identification module based on the data and the user classification; and automatically updating the oven with the second identification module. In this variation, the identification module is preferably calibrated by the remote computing system, but can alternatively be calibrated by any other suitable computing system. Retrieving a copy of the identification module can include: retrieving the copy from remote computing system storage (e.g., retrieving a global copy, retrieving a copy associated with the oven, retrieving a copy associated with the user account, retrieving a identification module version identified by the oven, etc.); requesting and/or receiving the copy from an oven (e.g., the oven from which the user classification was received, a second oven, etc.), or retrieving the copy in any other suitable manner. However, the identification module can be otherwise updated.

2.3 Determining Cooking Instructions Based on the Foodstuff Features.

Determining cooking instructions based on the foodstuff features S300 functions to determine future cooking instructions for the foodstuff currently within the oven, or record the cooking parameters of the current cooking session (based on the foodstuff currently within the oven) for future use in other cooking sessions. The cooking instructions are preferably determined by the remote system, but can alternatively be determined by the user device, the oven, a secondary user's device, or any other suitable computing system. The cooking instructions are preferably determined in response to receipt of the user confirmation (e.g., receipt of the identification selection), but can alternatively be determined in response to foodstuff detection within the cooking cavity, be determined in anticipation of foodstuff insertion into the cavity (e.g., based on a secondary cooking apparatus, a mealplan, etc.), or be determined at any other suitable time. The cooking instructions are preferably specific to the foodstuff class, and can additionally or alternatively be specific to the user associated with the cooking session, the oven, a set of users (e.g., sharing a common parameter), or otherwise specified. Alternatively, the cooking instructions can be generic. The user associated with the cooking session can be identified through: the identifier for the user device connected to oven temporally proximal the foodstuff insertion event, biometrics (e.g., received from oven user input during foodstuff insertion, selection entry, etc.), or otherwise determined.

The cooking instructions can be oven operation instructions, new target foodstuff parameter values, user oven interaction instructions (e.g., displayed on an oven display or on the user device), or be any other suitable instruction. Oven operation instructions (e.g., recipes) can include target oven parameter values (e.g., wherein the oven automatically converts the target values into control instructions), component control instructions, oven parameter value patterns (e.g., target oven parameter values associated with predetermined timestamps), oven parameter values associated with foodstuff cooking states, oven operation states (e.g., on, off, standby, etc.), or any other suitable operation instruction. Examples of oven operation instructions include: target oven parameter values, such as a target cavity temperature; control instructions for a set of heating elements 300, such as the amount of power to supply to each individual heating element; control instructions for a set of fans, such as the rotation speed for each individual fan; or be any other suitable oven operation instruction. Examples of user interaction instructions include instructing the user to open the oven door (e.g., when airflow provided by the fans is insufficient, such as when making macarons). However, any other suitable cooking instruction can be generated.

In a first variation, the cooking instructions (e.g., recipe) are retrieved based on a foodstuff identifier, but can be otherwise determined (e.g., from a mealplan, etc.). The foodstuff identifier can be scanned from the food or food packaging in-situ, automatically determined based on the sensor measurements (e.g., from the foodstuff image), received from a user (e.g., the selected identifier), or otherwise determined. The cooking instructions can be retrieved from the oven's on-board storage (e.g., wherein the oven stores recipes for each of a plurality of foodstuff classes), from a remote computing system, or from any other suitable endpoint. The cooking instructions can be retrieved by the system identifying the foodstuff, the oven, or any other suitable system. When the system identifying the foodstuff is not the oven, the system can additionally send the cooking instructions to the oven. For example, the system can automatically determine that the food within the oven is chicken (e.g., based on image analysis or machine vision), determine that the chicken is frozen, and automatically select a cooking pattern (e.g., baking temperature pattern) to thaw and cook the chicken to the user's preferences. However, the cooking instructions can be otherwise determined.

This variation can optionally include adjusting the retrieved cooking instructions based on the sensor measurements (e.g., foodstuff parameters, oven parameters), wherein the cooking elements are controlled based on the adjusted cooking instructions. For example, an initial warmup period can be extended or added in response to determination that the foodstuff is frozen or that the cooking cavity has not been preheated. In a second example, the cooking instructions can be dynamically adjusted during the cooking session to accommodate for foodstuff performance. In a specific example, the method can include determining a cooking status based on the foodstuff parameters (e.g., monitoring the foodstuff while cooking), comparing the actual cooking status and expected cooking status, and adjusting the cooking instructions based on the comparison (e.g., to meet a target cooking status by a predetermined time). However, the instructions can be otherwise adjusted.

Figure 26:
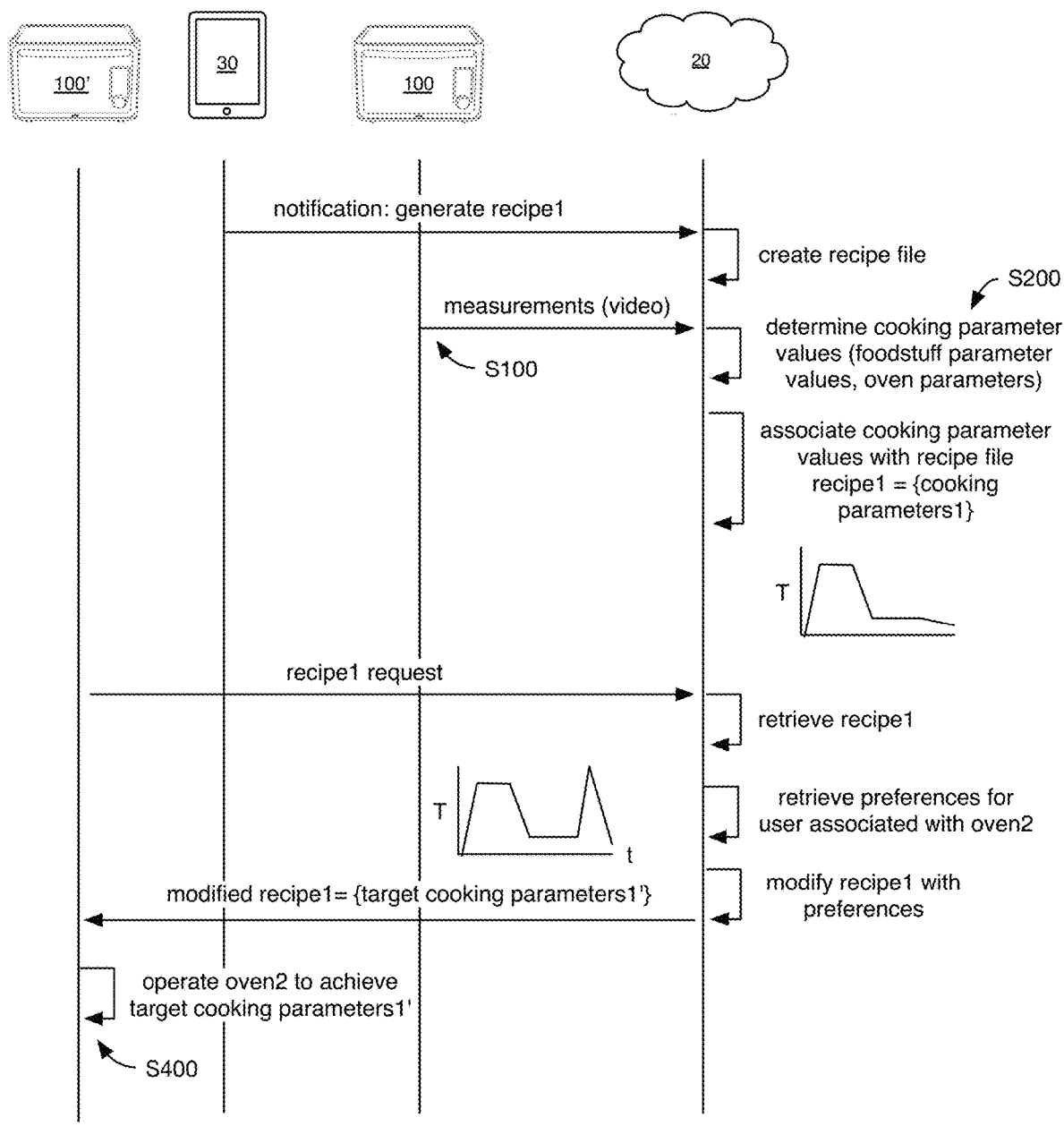
FIG. 26 is a schematic representation of a variation of automated recipe generation and secondary oven operation based on the generated recipe.

In a second variation, as shown in FIG. 26, the method includes recording the current cooking parameters S101, which can function to monitor the current cooking state of the food and/or automatically generate a recipe from the user's cooking session, such that the cooking parameters function as the cooking instructions for a future cooking session. In one embodiment, the method records the oven operating parameters during the cooking session. In a second embodiment, the method records the foodstuff parameters during the cooking session, wherein the foodstuff parameters can be directly measured or determined from a set of foodstuff measurements taken by the oven or secondary sensor. For example, the remote system can analyze the audio and/or images streamed from the oven to categorize the cooking stage of the food, the color profile of the food, or any other suitable foodstuff parameter. The categorization can be learned (e.g., based on a trained set, dynamically learned from user feedback on the images and/or audio, etc.), assigned by the user, or otherwise determined.

Recording the current cooking parameters S310 can include recording the current cooking parameters by the oven, sending the recorded cooking parameters to a remote system, and storing the current cooking parameters in association with a user account at the remote system. The user account can be manually generated by the user, automatically generated (e.g., based on the preferences of a user's social network, extracted from the user's social networking system accounts, based on historic cooking sessions, etc.), or otherwise generated. The cooking parameters can additionally be associated with a recipe (e.g., authored by the user or authored by a secondary user, wherein the recorded cooking parameters can be used to fine-tune the secondary user's recipe for other users or for the primary user), a user preference (e.g., wherein the cooking parameters can be analyzed to extract a cooking preference for the user), or associated with any other suitable information.

Figure 25:
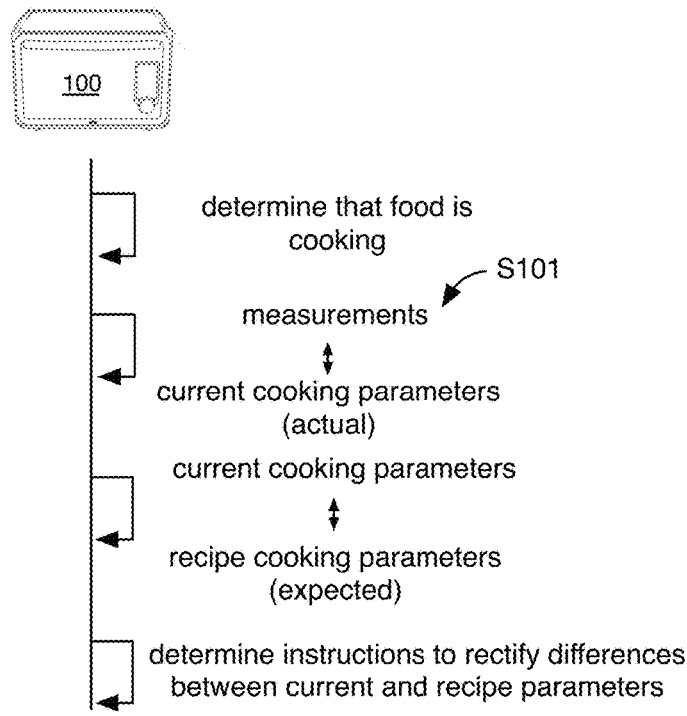
FIG. 25 is a schematic representation of a variation of automatic oven operation adjustment based on measured cooking parameters.

In a third variation, as shown in FIG. 25, the method includes determining future cooking parameter values. Determining future cooking parameter values can include recording the current cooking parameter values (e.g., as in the first variation), estimating a future cooking parameter value based on the current cooking parameter values, comparing the estimated cooking parameter value to a target cooking parameter value, and generating instructions that rectify differences between the estimated cooking parameter value and the target cooking parameter value. However, the future cooking parameter values can be otherwise determined.

In one example of the second variation, the method includes determining the current cooking state of the food (current foodstuff parameter values) within the oven cavity, estimating the future cooking state of the foodstuff at a future time based on the current cooking state and/or the current oven operation parameters, comparing the estimated cooking state to a target cooking state for the future time, and generating cooking instructions to achieve the target cooking state. In a specific example, the system can automatically instruct the oven to apply indirect heat (e.g., by lowering the radiation output of a heating element proximal the foodstuff and increasing the radiation output of a heating element distal the foodstuff) in response to determination that the foodstuff exterior is cooking faster than a target rate and/or the foodstuff interior is cooking slower than a second target rate.

In a second example, the method includes determining the current oven operation parameter, comparing the current operation parameter to the target operation parameter for the current time, and generating instructions to adjust the current operation parameter to substantially match the target operation parameter. In a specific example, the method can include measuring the current oven cavity temperature, determining that the oven cavity temperature is lower than the target temperature (e.g., determined from a recipe or from a target foodstuff parameter), and increasing the radiation output of the heating elements to substantially meet the target temperature.

In a third example, the method includes determining the current oven operation parameter, estimating a future oven parameter value, and generating instructions to adjust the current operation parameter to substantially match the target operation parameter for the future time. In a specific example, the system can determine the current cavity temperature, estimate a future cavity temperature given the current airflow and/or radiation output of the heating elements 300, generate instructions to increase airflow and/or decrease heating element output if the future cavity temperature exceeds the target future cavity temperature, and generate instructions to decrease airflow and/or increase heating element output if the future cavity temperature falls below the target future cavity temperature. However, oven operation instructions can be otherwise generated for the instantaneous cooking session.

In a fourth variation, the method includes receiving cooking instructions from a user device, which allows the user to remotely control oven operation. The cooking instructions can be received before foodstuff insertion into the cooking cavity, after foodstuff identification, before control instruction retrieval, after control instruction retrieval, during the cooking session (e.g., wherein the oven dynamically responds to the operation instructions), or at any other suitable time. The cooking instructions can be used to modify a predetermined set of cooking instructions, be used in lieu of the predetermined set of cooking instructions, or be otherwise used. In one example, the method can include receiving foodstuff parameter values from the user device (e.g., "crispier"), determining oven operation instructions to achieve the foodstuff parameter values based on the instantaneous oven operation parameters (e.g., by the oven or remote computing system), and control the oven to operate according to the determined operation instructions. In a second example, the method can include receiving cooking element operation instructions from the user device (e.g., increase right fan speed, rotate both fans in the same direction, rotate both fans in opposing directions, increase the heat output by the back heating element, etc.) and automatically operate the cooking element according to the cooking element operation instructions. However, the cooking instructions can be otherwise utilized.

The user-specified oven cooking instructions can additionally be used to adjust subsequent cooking instructions for the same or related food classes for the user, oven, general population of ovens, and/or general population of users. The cooking instructions can be adjusted by the oven, the remote computing system, the user device, or any other suitable computing system. The user-specified oven cooking instructions can additionally be used as a training set to determine the ideal set of cooking instructions for a food class. The cooking instructions can be received directly at the oven (e.g., over a short-range communication channel), indirectly through the remote computing system (e.g., through a long-range communication channel), or otherwise received from the user device.

In one example, the method can include: receiving cooking element control instructions from a user device; controlling the cooking elements based on the received cooking element control instructions; sending the received cooking element control instructions to the remote computing system, wherein the remote computing system stores the cooking element control instructions in association with a user account associated with the user device; determining a second recipe (e.g., updated recipe) based on the first recipe and the received cooking element control instructions; storing the second recipe in the computer memory or by the remote computing system; and in response to subsequent user selection of the identifier for the foodstuff class, controlling the cooking elements based on the second recipe. In a second example, multiple cooking instructions can be received from multiple users cooking similar foodstuff in their respective ovens, wherein the remote computing system can generate a new set of common cooking instructions for the foodstuff class based on the multiple users' cooking instructions. The new set of common cooking instructions can be subsequently pushed to all ovens, the respective ovens, or any other suitable oven, wherein the receiving ovens subsequently use the new set of common cooking instructions to cook the foodstuff class. The new set of common cooking instructions can be an average of the received cooking instructions, a mean of the received cooking instructions, the most popular cooking instructions (e.g., cooking instructions shared between the received instructions), or be otherwise determined. However, the method can otherwise utilize the cooking instructions received from the user device.

2.4 Dynamic Oven Control Based on the Cooking Instructions.

Dynamically controlling the oven based on the cooking instructions S400 functions to operate the oven based on the cooking instructions. The oven is preferably automatically controlled to execute the cooking instructions, but can alternatively be controlled according to default cooking instructions, manually controlled, or otherwise controlled. The processor preferably automatically controls cooking element operation, but any other suitable computing system can control cooking element operation. Cooking elements can include: heating elements, convection elements, fluid injection elements (e.g., steam, smoke, etc.), vents or valves, or any other suitable oven element.

In one variation, the oven receives oven operation instructions from the remote system, mobile device, or other computing system, and controls the oven components according to the operation instructions.

In a second variation, the foodstuff within the oven is categorized (e.g., by the oven, by the remote system, by the mobile device, etc.) based on one or more images, the oven receives cooking instructions associated with the foodstuff category (e.g., retrieves the cooking instructions, etc.), and the oven operates (e.g., cooks the food) based on the received cooking instructions.

In a third variation, a food parameter value is determined (e.g., internal temperature, etc.; determined by the oven, by the remote system, by the mobile device, etc.) at a first time (e.g., a first cooking stage) and compared to the estimated or target food parameter value for the foodstuff's cooking stage, wherein the oven can be operated to rectify any differences in between the determined and target food parameter values. In a specific example, in response to determination that the food is cooking too slowly or is drying out, the system can automatically determine steam injection parameters (e.g., volume, rate, etc.) and control the oven to inject steam into the cooking chamber according to the determined steam injection parameters. The cooking stage can be determined based on the amount of time the food has been cooking, the oven temperature pattern over the cooking time, the determined food parameter value (e.g., food reflection, food audio, food color, food emissivity, etc.), or determined in any other suitable manner.

Figure 27:
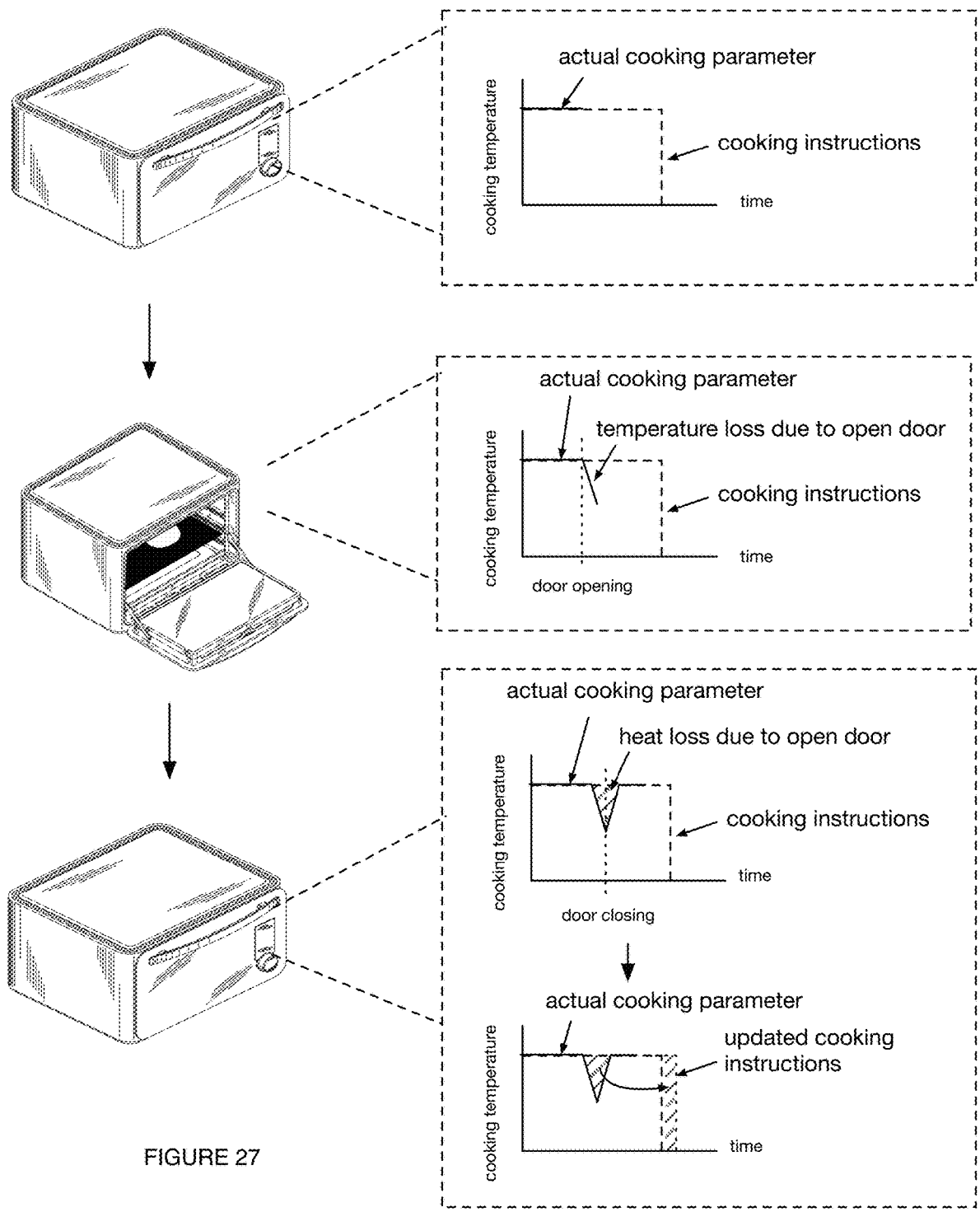
FIG. 27 is a schematic representation of a specific example of dynamic cooking element control.
Figure 28:
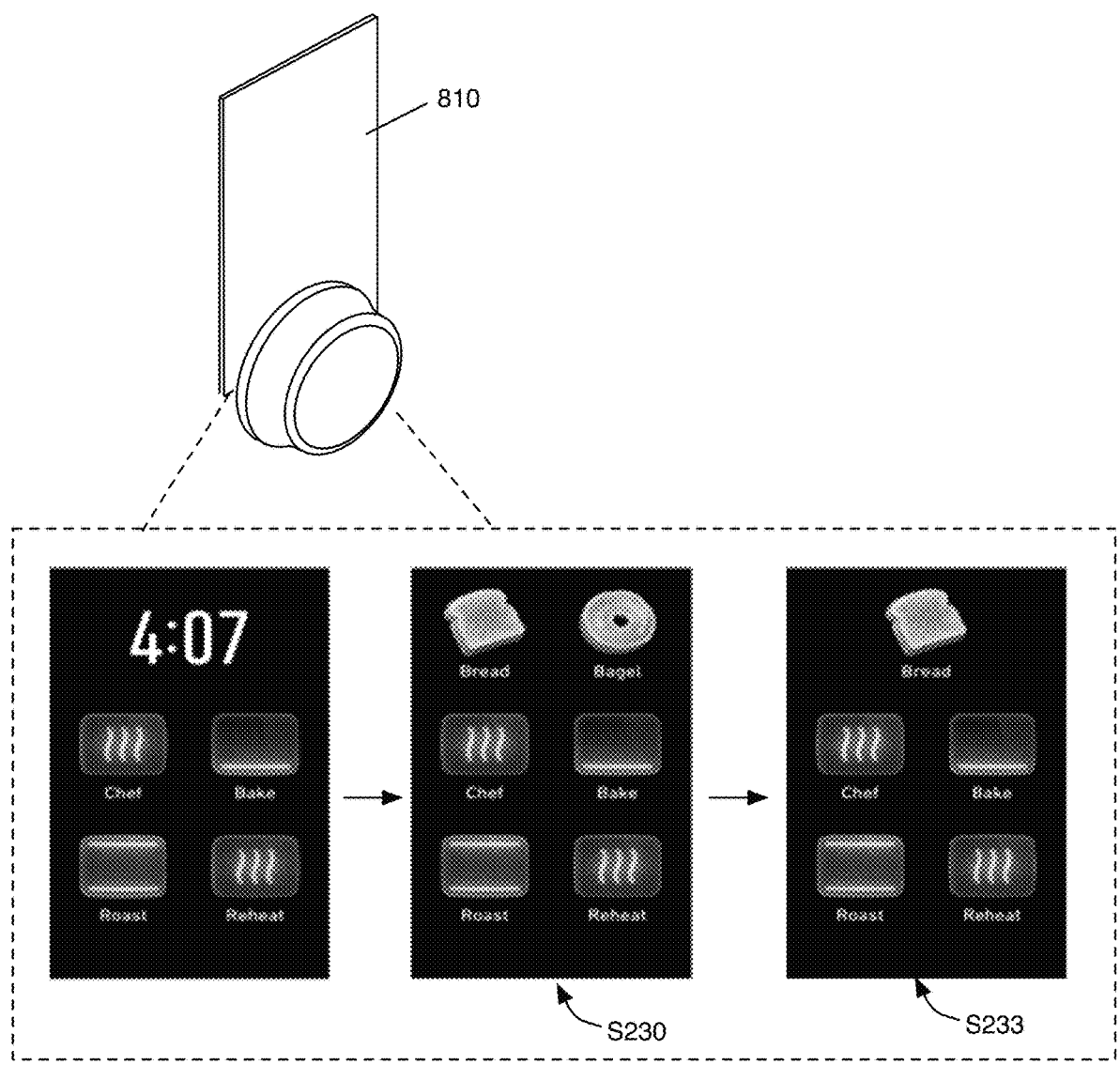
FIG. 28 is a schematic representation of a specific example of foodstuff identifier presentation and user confirmation receipt.
Figure 29:
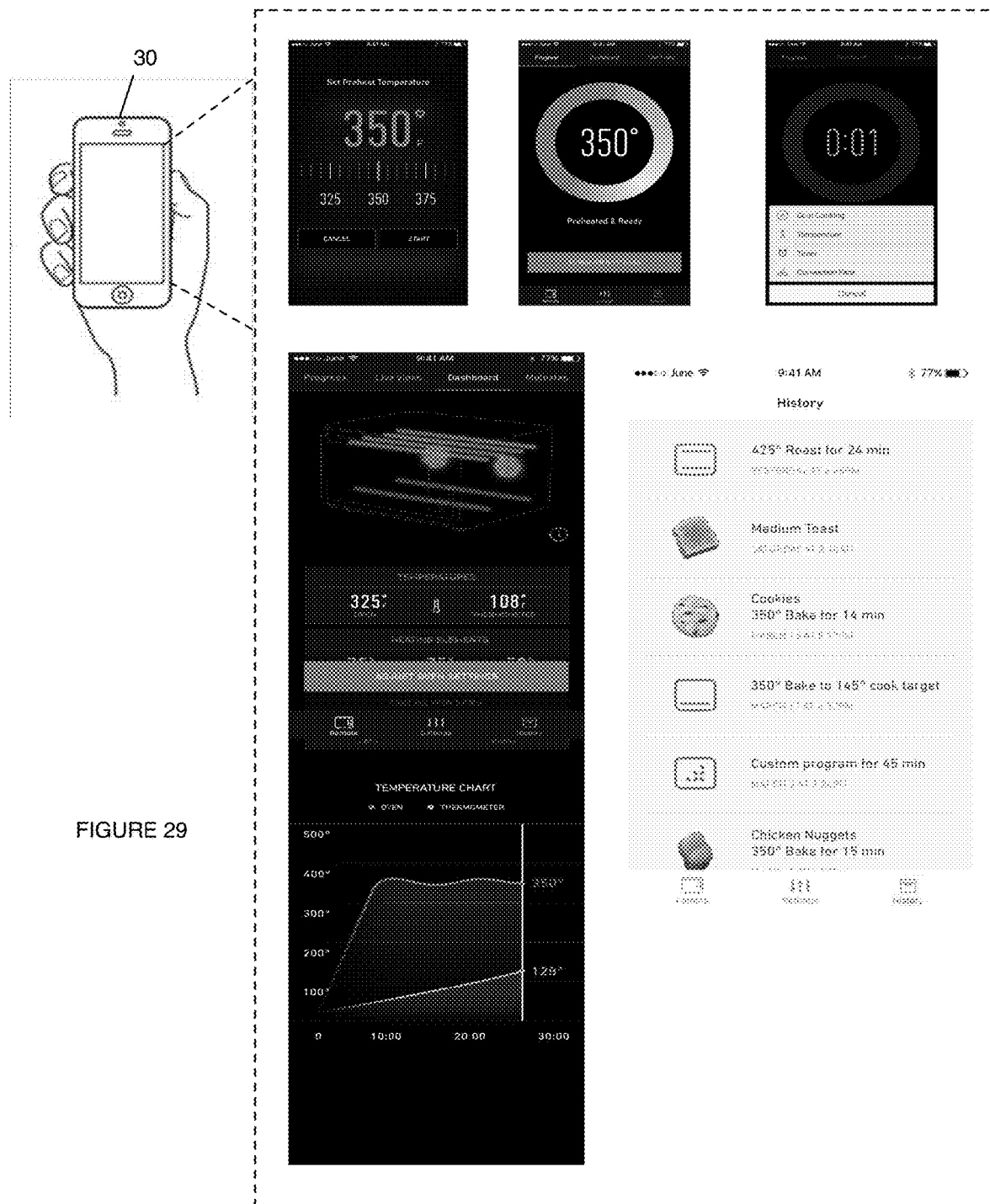
FIG. 29 is a schematic representation of various specific examples of user device interfaces.

In a fourth variation, dynamically controlling the cooking elements includes: determining operation of an oven component, determining a change in a cooking parameter due to oven component operation, and dynamically adjusting the cooking instructions to accommodate for the change in the cooking parameter. The cooking parameter and/or cooking instructions change can be determined by the oven, remote computing system, user device, or other computing system. In an example of the fourth variation, dynamically controlling the cooking elements includes: detecting oven door actuation, determining an amount of heat lost to the open door, and adjusting the cooking instructions to accommodate for the heat loss. Oven door actuation (e.g., door opening) can be detected using: a door sensor, light sensor, door accelerometer, the oven camera, or other detection means. The amount of heat lost to the open door can be determined by monitoring the cooking cavity temperature (e.g., using optical methods, cavity temperature sensor, etc.), monitoring the foodstuff surface temperature, estimating the thermal loss based on oven component operation (e.g., based on the convection element speed, heating element operation, etc.), estimating the thermal loss based on ambient environment parameters (e.g., using exterior temperature sensors, etc.), a combination of the above, or otherwise determining the amount of heat lost to ambient. Adjusting the cooking instructions to accommodate for heat loss can include adding time to the end of the cooking session, increasing the target temperature, injecting a controlled volume of steam at a controlled rate, or otherwise adjusting the cooking instructions. In a specific example, shown in FIG. 27, the amount of heat loss over time can be calculated (e.g., integrated), additional time for the foodstuff is calculated (e.g., based on the amount of heat that needs to be replenished and the temperature), and the additional time added to the end of the cooking session (e.g., to extend the cooking session). However, cooking parameter changes can be otherwise accommodated.

However, the oven can be otherwise operated based on the cooking instructions.

2.5 User Notifications.

The method can additionally function to automatically generate user notifications based on the cooking parameters. The notification can be a cooking session completion notification (e.g., "ready to eat!"), an error notification, an instruction notification, or be any other suitable notification. The notification can be sent and/or displayed on the user device, oven display, or on any other suitable computing system. In one variation, the cooking session completion notification is generated in response to a target cooking parameter value being met. In one example, the notification is generated when a target cooking time is met. In a second example, the notification is generated when a target food parameter value, such as a target internal temperature, surface browning, or internal water content, is met. In a third example, the notification is generated when an instantaneous time falls within a predetermined time duration from the time to cooking completion, wherein the time to cooking completion is estimated based on the cooking status of the in-situ foodstuff. However, any other suitable notification can be generated in response to the occurrence of any other suitable event.

2.6 Streaming.

The method can additionally include sending the oven measurements from the oven to the remote computing system. This can function to provide the remote computing system with a rich source of cooking data from which to develop cooking instructions, updated identification modules, or other data structures. The remote computing system preferably stores all the oven measurements received from all ovens, but can alternatively extract and store features from oven measurements and discard the oven measurements or otherwise process the oven measurements. The remote computing system can additionally use the oven measurements from one or more ovens over one or more cooking sessions to automatically: accommodate for sensor degradation or calibration slip), generate an average cooking curve for a foodstuff class, create oven measurement visualizations (e.g., charts, .gifs, etc.), generate foodstuff predictions (e.g., finish time, etc.), perform population-level analyses (e.g., most common food for a given location or demographic), or otherwise use the oven measurements. The remote computing system can optionally stream all or a portion of the received oven measurements to a user device, user-specified endpoint (e.g., URI, received from the user device or otherwise associated with the user account), or other endpoint (e.g., in response to application activity, etc.), wherein the remote computing system can identify the second endpoint in response to oven measurement and/or other trigger condition receipt. Alternatively or additionally, the oven measurements can be sent directly to the user device from the oven. The oven measurements are preferably timestamped and associated with an oven identifier, but can be associated with any other suitable information. The oven measurements are preferably recorded and sent during the foodstuff cooking session, but can alternatively be sent afterward. The oven measurements can be sent in real- or near-real time (e.g., streamed), sent periodically, sent in response to receipt of a request, or sent at any other suitable time. All or a subset of the oven measurements (e.g., every other frame, etc.) can be sent to the remote computing system and/or user device.

2.7 Specific Examples.

In one example, the oven or remote system can identify the food being cooked and/or dynamically control oven operation to achieve a desired cooking parameter (e.g., based on a recipe, user preferences, etc.). The method can include recording a video or set of images of the foodstuff within the oven cavity while cooking, analyzing the images and/or audio of the cooking foodstuff, and categorizing the foodstuff. The foodstuff categorization can be sent to and/or displayed on the oven or an associated device (e.g., a user's smartphone), be used to retrieve cooking instructions (e.g., preparation preferences for the user, such as crispness preferences), or be used in any other suitable manner. The images can additionally be analyzed to extract the foodstuff cooking progress, wherein cooking instructions can be retrieved or generated to achieve a target foodstuff preparation state. In a specific example, the system can determine that the chicken is below a threshold level of crispness (e.g., based on image analysis or audio analysis) and generate heating element instructions (e.g., newly generated or by modifying a pre-existing set of instructions or recipe) to achieve the desired chicken skin crispness. The oven can subsequently receive the heating element instructions and control the heating element according to the instructions.

In a second example, the oven can automatically cook food based on a predetermined recipe. The recipe can be provided by the remote system, a secondary user, the primary user, or by any other suitable entity. The recipe can additionally be automatically or manually adjusted to meet the primary user's preferences. In a specific example, the recipe can include a set of oven operating instructions (e.g., temperatures, power provision to the heating elements 300, which heating elements to control, airflow, etc.) and/or food parameter targets (e.g., temperatures, colors, sounds, etc). For example, a chicken recipe can include a heating element temperature profile including a first time period of elevated temperature for all heating elements 300, a second time period of low temperature for the heating element distal the chicken, and a third time period of broiling temperature for the heating element proximal the chicken (e.g., proximal the skin-side of the chicken).

In a third example, the oven can automatically record and/or augment cooking instructions for a recipe generated by the primary user. In this example, the user can create or author a recipe concurrently with recipe preparation (e.g., concurrently with cooking the food). A computing system can automatically populate the cooking instructions portion of the recipe with the cooking parameters of the food, as it is prepared by the user. In this example, the user can select to author a recipe on a user device and enter the ingredients and/or general cooking steps. The remote system can create a new recipe file in response to the authoring selection, and store the ingredients and/or general cooking steps. In response to confirmation that the user is preparing food according to the recipe, the remote system can automatically store or otherwise associate cooking parameters received from the oven (that is associated with the user) with the recipe file. The stored cooking parameters recorded from the primary user's oven can subsequently be used to generate and/or control a secondary user's oven when the secondary user indicates that they are preparing the same or a related recipe. When the secondary user prepares a related recipe (e.g., where there are cooking parameter differences), the differences and/or similarities between the primary user's recipe and the secondary user's recipe can be stored in association with the file.

In a fourth example, the oven can automatically interact with or operate based on auxiliary system operation parameters.

In a first specific example, the oven can be connected to a connected sous vide system (e.g., wired or wirelessly), wherein the oven can identify food that had previously been in the sous vide system (e.g., based on mass, weight, temperature, etc.) and determine cooking parameters for the foodstuff based on the previous sous vide cooking parameters. The oven can additionally determine the time to sous vide cooking completion, and automatically pre-heat such that the oven will be preheated by the time the food is ready for the oven.

In a second specific example, the oven can automatically turn off in response to auxiliary connected device determination that the user has left the home. For example, a connected door lock or thermostat can determine that the user is no longer proximal the geofence marked as "home." The remote computing system, oven, or auxiliary connected device can determine that the oven is on (e.g., cooking), and generate and send a request to turn off the oven to the user device. The oven can automatically turn off in response to receipt of a "turn off" response from the user device. Alternatively, the oven can automatically turn off in response to completion of the cooking session (e.g., according to the recipe), in response to determination that the user is no longer proximal the geofence, or operate in any other suitable manner at any other suitable time.

Although omitted for conciseness, the preferred embodiments include every combination and permutation of the various system components and the various method processes.

As a person skilled in the art will recognize from the previous detailed description and from the figures and claims, modifications and changes can be made to the preferred embodiments of the invention without departing from the scope of this invention defined in the following claims.

We claim:

1. A method comprising:
   at a memory, storing a set of cooking instructions for each of a set of cooking appliance identifiers, wherein each set of cooking instructions comprises values for a different set of cooking parameters;
   determining a cooking appliance identifier for a cooking appliance;
   at a first sensor of the cooking appliance, sampling a first measurement;
   determining a foodstuff identifier for the food based on the first measurement;
   at the cooking appliance, automatically retrieving a set of cooking instructions associated with the cooking appliance identifier and foodstuff identifier; and
   automatically controlling the cooking appliance according to the set of cooking instructions.

2. The method of claim 1, wherein the set of cooking instructions are automatically retrieved based on a cooking appliance identifier for the cooking appliance.

3. The method of claim 2, wherein the cooking appliance comprises an oven, wherein the cooking appliance identifier comprises an oven identifier.

4. The method of claim 3, wherein the oven identifier uniquely identifies the oven.

5. The method of claim 2, further comprising, concurrently with automatically controlling the cooking appliance, automatically retrieving a second set of cooking instructions based on a second cooking appliance.

6. The method of claim 5, wherein the second set of cooking instructions are retrieved for the second cooking appliance based on the foodstuff identifier.

7. The method of claim 1, further comprising: at a local memory of the cooking appliance, storing the set of cooking instructions of the cooking recipe, wherein the cooking appliance is automatically controlled by an onboard processor connected to the local memory.

8. The method of claim 7, further comprising,
   receiving cooking instruction updates from the local memory; and
   updating the cooking instructions based on the cooking instruction updates.

9. The method of claim 1, wherein the first sensor comprises an optical sensor, wherein the first measurement comprises a first image, and wherein the foodstuff identifier is automatically determined based on the first image.

10. The method of claim 1, further comprising receiving user preferences in association with the foodstuff identifier, and, in response, generating modified cooking instructions based on the cooking instructions and the user preferences.

11. The method of claim 10, further comprising, at the memory, updating the cooking recipe with the modified cooking instructions.

* * * * *